US012027051B2

United States Patent
Narushima et al.

(10) Patent No.: US 12,027,051 B2
(45) Date of Patent: Jul. 2, 2024

(54) MOBILE OBJECT CONTROL APPARATUS, MOBILE OBJECT CONTROL METHOD, AND COMPUTER READABLE RECORDING MEDIUM

(71) Applicant: NEC Corporation, Tokyo (JP)

(72) Inventors: Kazuhiro Narushima, Tokyo (JP); Yoshiharu Maeno, Tokyo (JP); Kumiko Tadano, Tokyo (JP)

(73) Assignee: NEC CORPORATION, Tokyo (JP)

( * ) Notice: Subject to any disclaimer, the term of this patent is extended or adjusted under 35 U.S.C. 154(b) by 366 days.

(21) Appl. No.: 17/441,370

(22) PCT Filed: Mar. 25, 2020

(86) PCT No.: PCT/JP2020/013379
§ 371 (c)(1),
(2) Date: Sep. 21, 2021

(87) PCT Pub. No.: WO2020/196641
PCT Pub. Date: Oct. 1, 2020

(65) Prior Publication Data
US 2022/0180749 A1 Jun. 9, 2022

(51) Int. Cl.
*G08G 1/16* (2006.01)
*G08G 1/052* (2006.01)
*G08G 1/09* (2006.01)
*G08G 1/0967* (2006.01)

(52) U.S. Cl.
CPC ............. *G08G 1/166* (2013.01); *G08G 1/052* (2013.01); *G08G 1/096725* (2013.01)

(58) Field of Classification Search
CPC .. G08G 1/166; G08G 1/052; G08G 1/096725; G08G 1/163; G05D 1/02
See application file for complete search history.

(56) References Cited

U.S. PATENT DOCUMENTS

2019/0111874 A1* 4/2019 Harada ................. G01S 13/589

FOREIGN PATENT DOCUMENTS

| JP | 2006-113687 A | 4/2006 |
| JP | 2011-043884 A | 3/2011 |
| JP | 2013-061788 A | 4/2013 |

(Continued)

OTHER PUBLICATIONS

English translation of Written opinion for PCT Application No. PCT/JP2020/013379, dated Jun. 23, 2020.

(Continued)

*Primary Examiner* — Rodney A Butler

(57) ABSTRACT

A mobile object control apparatus, with respect to a first mobile object and a second mobile object, predicts whether the first and second mobile objects will collide with each other at an intersection. The apparatus calculates, when the first and second mobile objects will collide with each other at the intersection, a speed of the first mobile object at which the collision can be avoided at the intersection. The processor extracts a third mobile object that is in an intersection area and has passed through the intersection, and estimates that the third mobile object has a high possibility of colliding with the first mobile object at the intersection. The intersection area is set at the intersection through which the first mobile object passes.

13 Claims, 15 Drawing Sheets

(56) References Cited

FOREIGN PATENT DOCUMENTS

| | | | |
|---|---|---|---|
| JP | 2017-182409 A | 10/2017 | |
| JP | 2017-224146 A | 12/2017 | |
| JP | 2018-124812 A | 8/2018 | |
| JP | 2018-129028 A | 8/2018 | |

OTHER PUBLICATIONS

International Search Report for PCT Application No. PCT/JP2020/013379, dated Jun. 23, 2020.

* cited by examiner

Fig.5

| TRANSPORT ROUTE ID | START POINT | END POINT | PASSING POINT | SHAPE | INTERSECTION |
|---|---|---|---|---|---|
| R1 | (5,3) | (5,1) | none | STRAIGHT LINE | none |
| R2 | (8,3) | (8,1) | none | STRAIGHT LINE | none |
| R3 | (11,3) | (11,1) | none | STRAIGHT LINE | none |
| R4 | (17,1) | (19,23) | (17,12),(19,12) | KEY-LIKE LINE | (17,8) |
| R5 | (21,5) | (21,19) | none | STRAIGHT LINE | (21,8) |
| R6 | (23,5) | (23,19) | none | STRAIGHT LINE | (23,8) |
| R7 | (1,17) | (15,23) | none | ARC | none |
| R8 | (1,17) | (12,23) | none | ARC | none |
| R9 | (1,17) | (9,23) | none | ARC | none |
| R10 | (14,1) | (31,8) | (14,8) | KEY-LIKE LINE | (17,8), (21,8), (23,8) |
| R11 | (1,11) | (3,11) | none | STRAIGHT LINE | none |
| R12 | (1,8) | (3,8) | none | STRAIGHT LINE | none |
| R13 | (1,5) | (3,8) | none | STRAIGHT LINE | none |

Fig.6

| GUIDED VEHICLE ID | SET SPEED | BRAKING DISTANCE |
|---|---|---|
| AGV1 | 12km/h | $1/100 * v^2$ |
| AGV2 | 12km/h | $1/100 * v^2$ |
| AGV3 | 12km/h | $1/100 * v^2$ |
| AGV4 | 12km/h | $1/100 * v^2$ |
| AGV5 | 10km/h | $1/150 * v^2$ |
| AGV6 | 10km/h | $1/150 * v^2$ |
| ⋮ | ⋮ | ⋮ |

Fig.7

| GUIDED VEHICLE ID | TRANSMISSION DELAY PERIOD[s] |
|---|---|
| AGV1 | 1 |
| AGV2 | 0.2 |
| AGV3 | 10 |
| ⋮ | ⋮ |

Fig.8

| AREA ID | MOBILE OBJECT ID | OBTAINMENT DATE/TIME | COORDINATES | ID OF TRANSPORT ROUTE CURRENTLY TAKEN |
|---|---|---|---|---|
| AREA 1 | AGV1 | 10:34:54 | (17,1) | R4 |
| | AGV2 | 10:35:05 | (21,6) | R5 |
| | AGV3 | 10:35:20 | (29,8) | R10 |
| | ... | ... | ... | ... |

81

MOBILE OBJECT CONTROL APPARATUS, MOBILE OBJECT CONTROL METHOD, AND COMPUTER READABLE RECORDING MEDIUM

This application is a National Stage Entry of PCT/JP2020/013379 filed on Mar. 25, 2020, which claims priority from PCT International Application PCT/JP2019/013835 filed on Mar. 28, 2019, the contents of all of which are incorporated herein by reference, in their entirety.

TECHNICAL FIELD

The present invention relates to a mobile object control apparatus and a mobile object control method that control a mobile object, and further relates to a computer readable recording medium having recorded therein a program for realizing the same.

BACKGROUND ART

A transport system that uses automated guided vehicles (AGVs) improves work efficiency, production efficiency, and so forth, and is thus incorporated in various types of factories. Furthermore, automated guided vehicles are also incorporated in various types of logistic facilities to achieve work efficiency, rapid delivery, and so forth.

Moreover, in a transport system, in order to secure safety, it is indispensable to avoid a collision between automated guided vehicles at an intersection where routes that have been respectively set for the automated guided vehicles in advance intersect.

In view of this, as a related technique, patent document 1 discloses an information processing apparatus that causes an automated guided vehicle to detour in order to avoid a collision at an intersection, and also suppresses a reduction in the travel efficiency of the automated guided vehicle. Also, patent document 2 discloses a system that causes a plurality of automated guided vehicles to travel safely and efficiently without giving rise to, for example, a deadlock caused by interference between automated guided vehicles.

LIST OF RELATED ART DOCUMENTS

Patent Document

Patent document 1: Japanese Patent Laid-Open Publication No. 2018-129028
Patent document 2: Japanese Patent Laid-Open Publication No. 2006-113687

SUMMARY

Technical Problems

In a transport system, a control apparatus that controls traveling of automated guided vehicles controls a plurality of automated guided vehicles via communicating with the automated guided vehicles. In a transport system, there are cases where the communication quality decreases due to the influences of the environment inside a factory and a logistic facility, the environment outside a factory and a logistic facility, and the communication environment.

For example, in the case of a wireless communication system, a decrease in the communication quality is caused by the influences of (i) congestion in communication caused by exchange of a large amount of data, (ii) coexistence of different wireless communication systems, (iii) shielding of wireless communication by large-scale equipment, metal equipment, and the like installed in a factory and a logistic facility, (iv) interference by noise caused by such equipment as large-scale motors, (v) a failure in equipment inside a wireless communication system, and so forth. Note that the failure in equipment refers to, for example, restarting of an access point and the like for initializing the internal state when processing has stopped due to an electric overload, when an abnormality has occurred, and so forth.

Furthermore, when the communication quality has decreased, there is a possibility that a communication delay occurs between automated guided vehicles and a control apparatus, and the automated guided vehicles collide with each other at the aforementioned intersection. For this reason, when the communication quality has decreased, safety is secured by bringing automated guided vehicles into an emergency stop.

Safety has been secured by bringing automated guided vehicles to an emergency stop and, however, restarting operation for the automated guided vehicles requires much time. Therefore, emergency stop of automated guided vehicles reduces travel efficiency of the automated guided vehicles.

However, patent documents 1 and 2 mentioned above do not disclose a technique to avoid a collision between automated guided vehicles in a case where the communication quality has decreased. Furthermore, patent documents 1 and 2 also do not disclose a technique to prevent the travel efficiency of automated guided vehicles from being reduced in a case where the communication quality has decreased.

An example object of the present invention is to provide a mobile object control apparatus, a mobile object control method, and a computer readable recording medium that avoid a collision between mobile objects and also suppress a reduction in the travel efficiency of mobile objects, even in a case where the communication quality has decreased.

Solution to the Problems

In order to achieve the aforementioned object, a mobile object control apparatus according to an example aspect of the present invention includes:

a prediction unit that, with respect to a target first mobile object and a second mobile object that has a high possibility of colliding with the first mobile object, predicts whether the first mobile object and the second mobile object collide with each other at an intersection by calculating a first arrival time at which the first mobile object arrives at the intersection and a second arrival time at which the second mobile object arrives at the intersection, the calculation being performed using position information indicating positions, speed information indicating speeds, intersection position information indicating a position of the intersection, and communication delay period information indicating communication delay periods; and a calculation unit that, when it is predicted that the first mobile object and the second mobile object collide with each other at the intersection, calculates a speed of the first mobile object at which the collision can be avoided at the intersection based on a collision avoidance condition denoted by using distance information indicating a difference between a path from the first mobile object to the intersection and a path from the second mobile object to the intersection, braking distance information indicating a braking distance of the first mobile object, and speed information and a communication delay period of the second mobile object, wherein the prediction unit extracts a third mobile object that remains in an intersection area and has passed through the intersection, and predicts that the third mobile object is a mobile object that has a high possibility of colliding with the first mobile object at the intersection, the intersection area being set in advance at the intersection through which the first mobile object passes.

Also, in order to achieve the aforementioned object, in a mobile object control method according to an example aspect of the present invention, a computer (a) predicts, with respect to a target first mobile object and a second mobile object that has a high possibility of colliding with the first mobile object, whether the first mobile object and the second mobile object collide with each other at an intersection by calculating a first arrival time at which the first mobile object arrives at the intersection and a second arrival time at which the second mobile object arrives at the intersection, the calculation being performed using position information indicating positions, speed information indicating speeds, intersection position information indicating a position of the intersection, and communication delay period information indicating communication delay periods, and (b) when it is predicted that the first mobile object and the second mobile object collide with each other at the intersection, calculates a speed of the first mobile object at which the collision can be avoided at the intersection based on a collision avoidance condition denoted by using distance information indicating a difference between a path from the first mobile object to the intersection and a path from the second mobile object to the intersection, braking distance information indicating a braking distance of the first mobile object, and speed information and a communication delay period of the second mobile object, and in the (a), a third mobile object that remains in an intersection area and has passed through the intersection is extracted, and the third mobile object is predicted to be a mobile object that has a high possibility of colliding with the first mobile object at the intersection, the intersection area being set in advance at the intersection through which the first mobile object passes.

Furthermore, in order to achieve the aforementioned object, a computer readable recording medium that includes a program recorded thereon according to an example aspect of the present invention includes an instruction that causes a computer to carry out:

(a) a step of, with respect to each of a target first mobile object and a second mobile object that has a high possibility of colliding with the first mobile object, predicting whether the first mobile object and the second mobile object collide with each other at an intersection by calculating a first arrival time at which the first mobile object arrives at the intersection and a second arrival time at which the second mobile object arrives at the intersection, the calculation being performed using position information indicating positions, speed information indicating speeds, intersection position information indicating a position of the intersection, and communication delay period information indicating communication delay periods; and (b) a step of, when it is predicted that the first mobile object and the second mobile object collide with each other at the intersection, calculating a speed of the first mobile object at which the collision can be avoided at the intersection based on a collision avoidance condition denoted by using distance information indicating a difference between a path from the first mobile object to the intersection and a path from the second mobile object to the intersection, braking distance information indicating a braking distance of the first mobile object, and speed information and a communication delay period of the second mobile object, wherein in the step (a), a third mobile object that remains in an intersection area and has passed through the intersection is extracted, and the third mobile object is predicted to be a mobile object that has a high possibility of colliding with the first mobile object at the intersection, the intersection area being set in advance at the intersection through which the first mobile object passes.

Advantageous Effects of the Invention

As described above, according to the present invention, a collision between mobile objects can be avoided, and in addition, a reduction in the travel efficiency of mobile objects can be suppressed, even in a case where the communication quality has decreased.

BRIEF DESCRIPTION OF THE DRAWINGS

FIG. 5 depicts information indicating one example of a data structure of route information.

FIG. 6 depicts information indicating one example of a data structure of mobile object setting information.

FIG. 7 depicts information indicating one example of a data structure of communication delay information.

FIG. 8 depicts information indicating one example of a data structure of intra-area mobile object information.

EXAMPLE EMBODIMENT

First Example Embodiment

Figure 1:
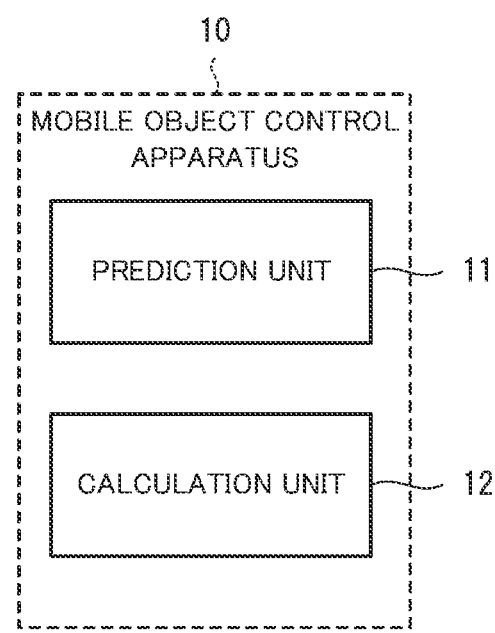
FIG. 1 is a diagram illustrating one example of a mobile object control apparatus.

The following describes a first example embodiment of the present invention with reference to the drawings. Note that in the drawings described below, the elements that have the same function or corresponding functions are given the same reference numeral, and a repetitive description thereof may be omitted.

[Apparatus Configuration]

Using FIG. 1, a description is now given of a configuration of a mobile object control apparatus 10 according to the present first example embodiment. FIG. 1 is a diagram illustrating one example of the mobile object control apparatus.

The mobile object control apparatus 10 illustrated in FIG. 1 is an apparatus that avoids a collision between mobile objects and also suppresses a reduction in the travel efficiency of mobile objects, even in a case where the communication quality has decreased. Also, as illustrated in FIG. 1, the mobile object control apparatus 10 includes a prediction unit 11 and a calculation unit 12.

Among these, the prediction unit 11 calculates, with respect to each of a target mobile object (first mobile object) and a mobile object that has a high possibility of colliding with the target mobile object (second mobile object), time at which the first mobile object arrives at an intersection (first arrival time) and time at which the second mobile object arrives at the intersection (second arrival time) with use of position information indicating positions, speed information indicating speeds, intersection position information indicating the position of the intersection, and communication delay period information indicating communication delay periods, and predicts whether the first mobile object and the second mobile object will collide with each other at the intersection.

When the first mobile object and the second mobile object are predicted to collide with each other at the intersection, the calculation unit 12 calculates a speed of the first mobile object at which the collision can be avoided at the intersection based on a collision avoidance condition denoted by using distance information indicating a distance between the first mobile object and the second mobile object, braking distance information indicating a braking distance of the first mobile object, and the speed information and the communication delay period of the second mobile object.

Note that the distance between the first mobile object and the second mobile object is, for example, a distance indicating the difference between a distance from the first mobile object to the intersection along a travel route (that is to say, a course from the first mobile object to the intersection) and a distance from the second mobile object to the intersection along a travel route (that is to say, a course from the second mobile object to the intersection). In other words, this distance is a distance from the first mobile object to the second mobile object via the intersection.

As described above, according to the present first example embodiment, even if a communication delay has occurred due to a decrease in the communication quality, the speed of the first mobile object can be changed in consideration of the communication delay period of the second mobile object, and thus the collision between the mobile objects can be avoided without stopping the first mobile object and the second mobile object. Therefore, even in a case where the communication quality has decreased, a reduction in the travel efficiency of the mobile objects can be suppressed.

[System Configuration]

Figure 2:
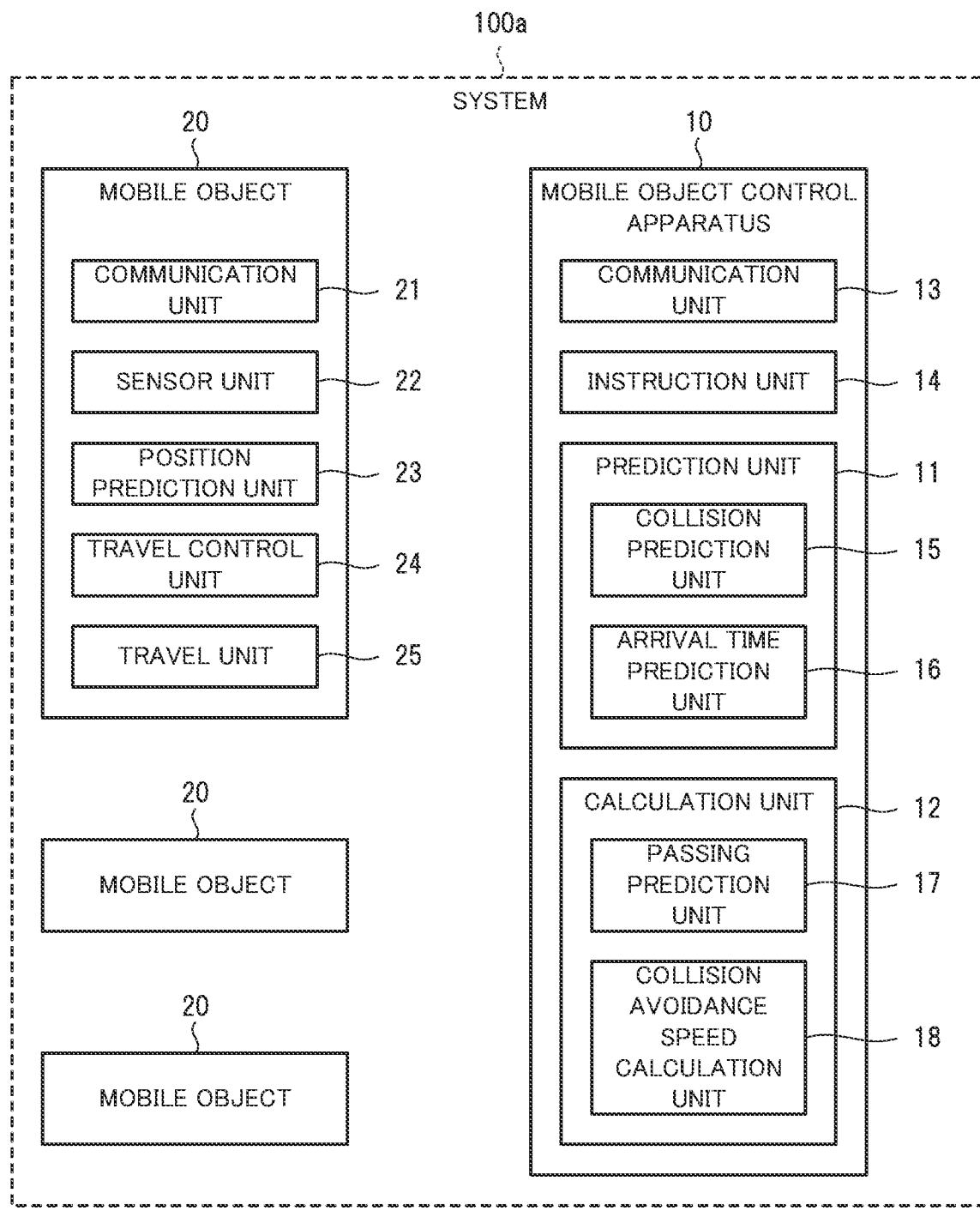
FIG. 2 is a diagram illustrating one example of a system in which the mobile object control apparatus plays the main role.
Figure 3:
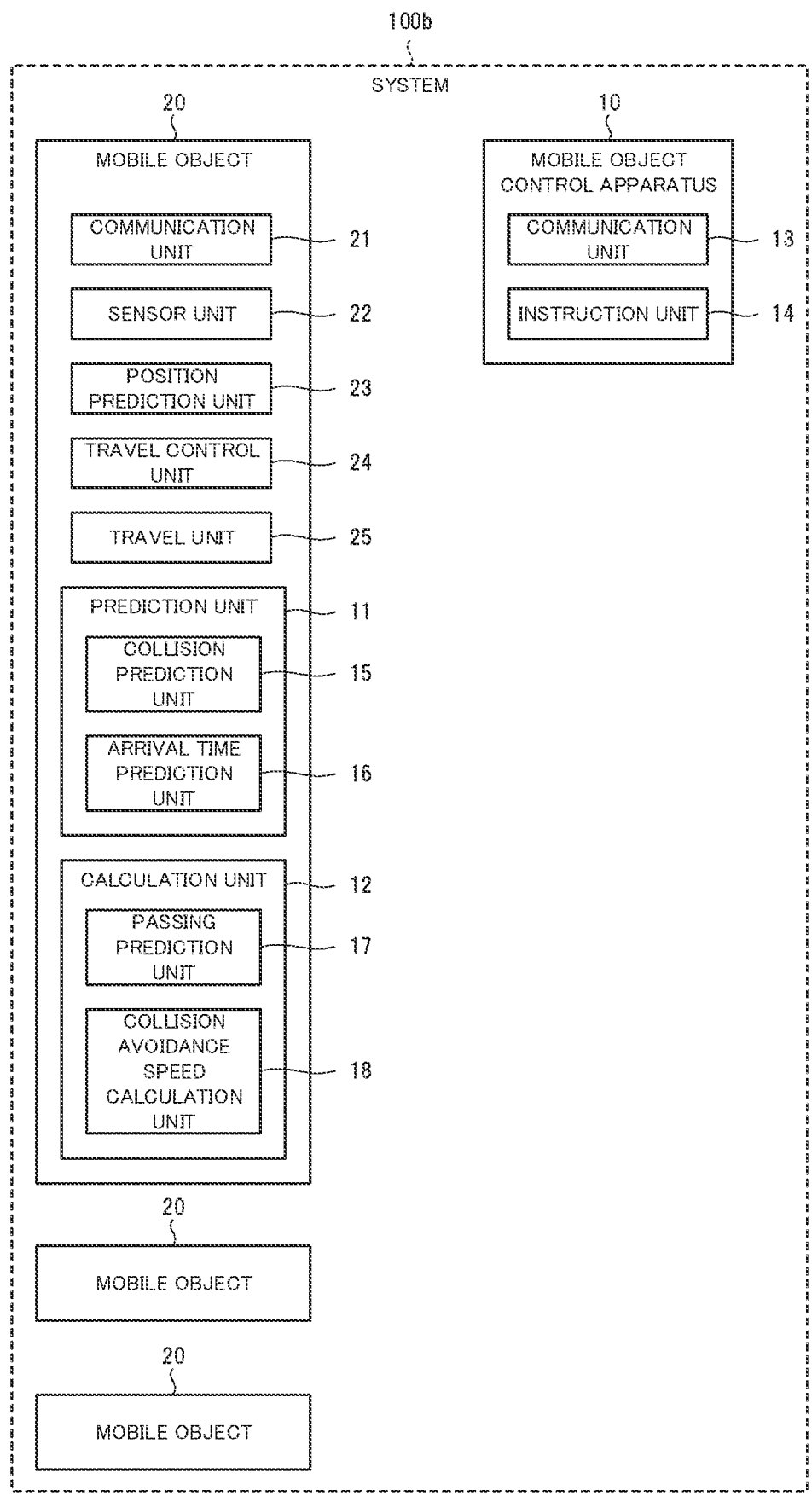
FIG. 3 is a diagram illustrating one example of a system in which mobile objects play the main role.

Using FIG. 2 and FIG. 3, the following describes the configuration of the mobile object control apparatus 10 according to the present first example embodiment more specifically. FIG. 2 is a diagram illustrating one example of a system in which the mobile object control apparatus plays the main role. FIG. 3 is a diagram illustrating one example of a system in which mobile objects play the main role. Systems 100 (100a, 100b) that are respectively illustrated in FIG. 2 and FIG. 3 include the mobile object control apparatus 10 and a plurality of mobile objects 20.

(1) System in which Mobile Object Control Apparatus Plays the Main Role

The mobile object control apparatus 10 illustrated in FIG. 2 includes a prediction unit 11, a calculation unit 12, a communication unit 13, and an instruction unit 14. Among these, the prediction unit 11 includes a collision prediction unit 15 and an arrival time prediction unit 16. Also, the calculation unit 12 includes a passing prediction unit 17 and a collision avoidance speed calculation unit 18. The mobile objects 20 include a communication unit 21, a sensor unit 22, a position prediction unit 23, a travel control unit 24, and a travel unit 25.

(2) System in which Mobile Objects Play the Main Role

The mobile object control apparatus 10 illustrated in FIG. 3 includes a communication unit 13 and an instruction unit 14. One of the mobile objects 20 includes a communication unit 21, a sensor unit 22, a position prediction unit 23, a travel control unit 24, a travel unit 25, a prediction unit 11, and a calculation unit 12. The prediction unit 11 includes a collision prediction unit 15 and an arrival time prediction unit 16. Also, the calculation unit 12 includes a passing prediction unit 17 and a collision avoidance speed calculation unit 18.

Note that the configuration of the system 100 may be a configuration other than the systems 100a and 100b described in the above (1) and (2).

With respect to each mobile object 20, the mobile object control apparatus 10 performs control to cause the mobile object 20 to travel to a target place. Note that the mobile object control apparatus 10 is, for example, an information processing apparatus, such as a server computer.

The mobile objects 20 obtain, from the mobile object control apparatus 10, instruction information that is used to control traveling of the mobile objects 20, and travel to a target place based on the instruction information. Note that the mobile objects 20 are, for example, automated guided vehicles, self-driving vehicles, automated flying objects, automated navigation vessels, robots, and so forth.

Note that the systems 100 include a storage unit, which is not illustrated in FIG. 2 and FIG. 3, for storing such information as route information, mobile object position information, mobile object setting information, communication delay period information, area information, and intra-area mobile object information. The storage unit may be inside the mobile object control apparatus 10, or may be outside the mobile object control apparatus 10. Also, a plurality of storage units may be provided. Furthermore, the aforementioned pieces of information may be stored in a plurality of storage units.

A description is now given of each of the aforementioned pieces of information.

Figure 4:
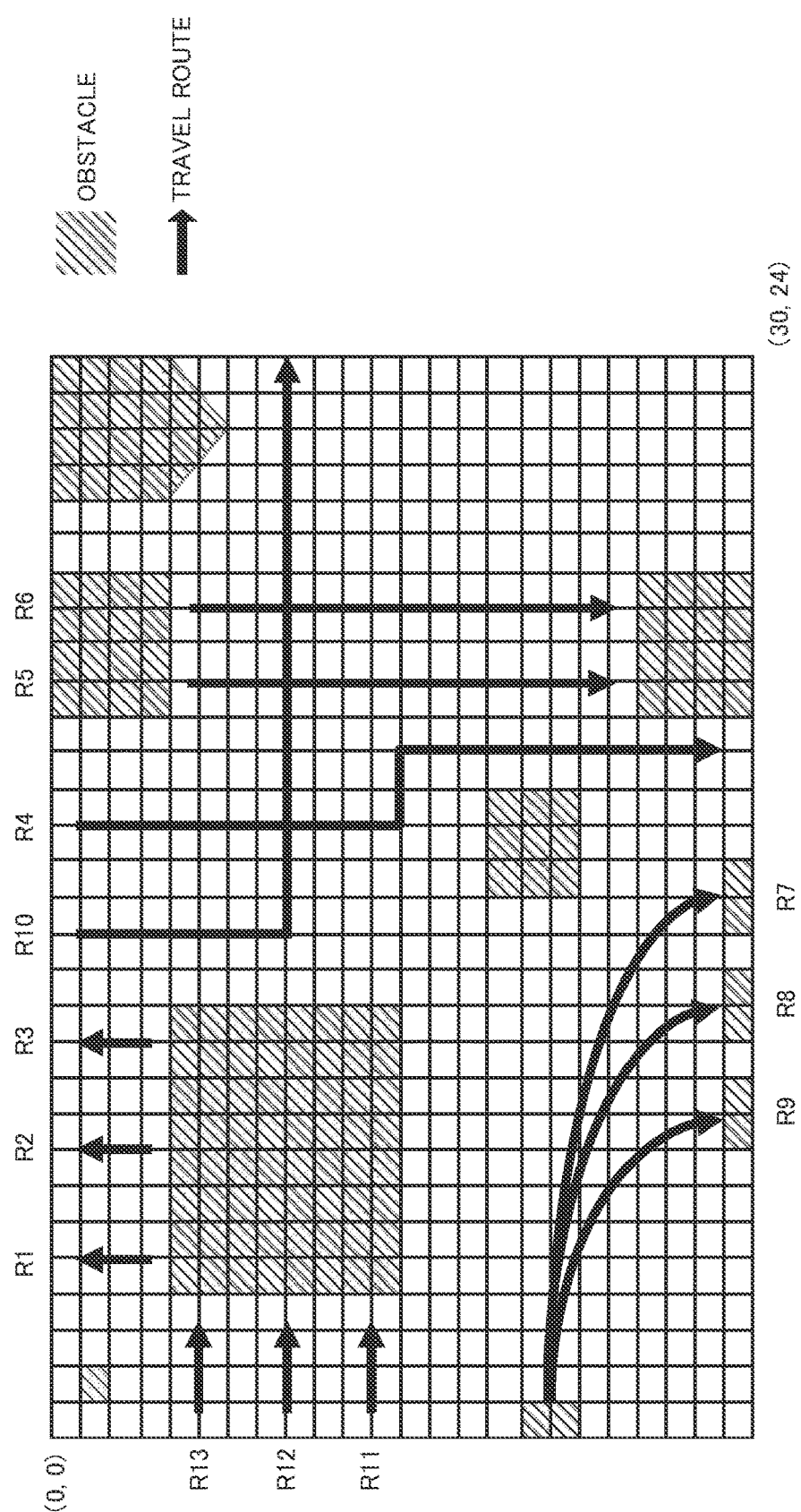
FIG. 4 depicts information indicating examples of travel routes.

The route information is information related to the routes by which the mobile objects 20 travel. Also, the route information is generated by a user and stored in the storage unit in advance. FIG. 4 depicts information indicating examples of travel routes. FIG. 5 depicts information indicating one example of a data structure of the route information.

The examples of FIG. 4 indicate a coordinate system for indicating the positions (coordinates) of the mobile objects 20 in a factory, a logistic facility, and the like, travel routes R1 to R13 (arrows with solid lines) by which the mobile objects 20 travel, and obstacles (ranges with oblique lines).

In route information 51 that is exemplarily illustrated in FIG. 5, the following are associated with one another: route identification information, "transport route ID", for identifying a route; route start-point information, "start point", indicating the coordinates of a start point of a route; route end-point information, "end point", indicating the coordinates of an end point of a route; passing point information, "passing point", indicating the coordinates through which the mobile objects 20 pass between a start point and an end point (the coordinates at which the direction is changed); route shape information, "shape", indicating the shape of a travel route; and intersection information, "intersection", indicating the position of an intersection along a travel route.

Note that information indicating, for example, transmission sources and transmission destinations of packages, standby locations of the mobile objects 20, and charging locations of the mobile objects 20, which are not illustrated in FIG. 4, may be added to the route information 51.

The mobile object position information is information related to the positions of the mobile objects 20. Also, the mobile object position information is generated by the mobile objects 20 and stored in the storage unit.

The mobile object position information is information in which the following are associated with one another: mobile object identification information for identifying the mobile objects 20; position information indicating the positions of the mobile objects 20; and date/time information indicating the dates/times of obtainment of the position information. The position information is, for example, information indicated by coordinates and the like. Note that the position information may be indicated by, for example, absolute coordinates, relative coordinates, vectors, patches, and the like. Furthermore, speed information indicating the speeds of the mobile objects 20 may be added to the mobile object position information.

As a method of obtaining the mobile object position information, the mobile object control apparatus 10 may obtain the mobile object position information from the mobile objects 20 by performing polling every predetermined period. Alternatively, the mobile object control apparatus 10 may obtain the mobile object position information transmitted by the mobile objects 20 every predetermined period. Alternatively, tags and the like provided with position information may be installed on, for example, a wall or a floor at a predetermined interval (an interval corresponding to coordinates), and the mobile object position information may be transmitted to the mobile object control apparatus 10 each time a mobile object 20 passes the tag.

The mobile object setting information is information related to the positions of the mobile objects 20. Also, the mobile object setting information is, for example, generated by a user and stored in the storage unit in advance. FIG. 6 depicts information indicating one example of a data structure of the mobile object setting information. As illustrated in FIG. 6, in mobile object setting information 61, the following are associated with one another: mobile object identification information, "guided vehicle ID", for identifying the mobile objects 20; set speed information, "set speed", indicating the travel speeds that are respectively set for the mobile objects 20; and braking distance information, "braking distance", indicating the braking distances of the mobile objects 20.

The set speed information is, for example, the speeds of the mobile objects 20 that have been set in advance, the maximum speeds of the mobile objects 20, the maximum speeds of the mobile objects 20 according to the specifications, the current speeds, or the like. Also, from a standpoint of energy efficiency, safety at the time of a collision, and the like, the set speed information may include the maximum permitted speeds that can be permitted. The set speed information may include, for example, the maximum accelerations of the mobile object 20 and the like.

As a braking distance varies depending on a travel speed, the braking distance information may indicate different braking distances for different set speeds. In the braking distance information, for example, the set speeds may be categorized into a plurality of stages, and the set speeds of respective stages may be associated with braking distances corresponding thereto. Also, the braking distance information may be denoted by a percentage of a set speed. The braking distance information may be denoted by, for example, the following ten stages: 1-10 [%] of the set speed, 11-20 [%] of the set speed, . . . , and 91-100 [%] of the set speed. Furthermore, the braking distance information may be denoted by a function of a set speed. The braking distance information may be, for example, a value obtained by multiplying a square of a set speed v by a coefficient ($\frac{1}{100} \times v^2$), as exemplarily illustrated in FIG. 6. In FIG. 6, "km/h" refers to kilometers per hour.

Also, the mobile object setting information may be information in which the following are associated with one another: information indicating the types of the mobile objects 20; set speed information; and braking distance information.

In a case where the mobile objects 20 are automated guided vehicles, the braking distances are influenced by brake performance, friction against a floor surface, the weight of the load, and so forth. The mobile object setting information may be generated using an experiment, a simulation, and the like in view of these influences.

Communication delay information is information related to the communication delay periods of respective mobile objects 20. FIG. 7 depicts information indicating one example of a data structure of the communication delay information. As shown in FIG. 7, in the communication delay information 71, the following are associated with one another: identification information, "mobile object ID", for identifying the mobile objects 20; and communication delay period information, "transmission delay period [s]", indicating communication delay periods. In FIG. 7, "s" refers to seconds.

The communication delay period information is information indicating a delay period in communication between the mobile object control apparatus 10 and the mobile objects 20. Specifically, the communication delay period information is a period (t1−t0) from a time point t0 at which a mobile object 20 obtained the latest mobile object position information to a time point t1 at which the mobile object control apparatus 10 obtained this mobile object position information. Also, the communication delay period information may be information that is collectively managed by the plurality of mobile objects 20 based on the communication processing capabilities of and the communication protocols used by the mobile objects 20, the areas in which the mobile objects 20 are present, and so forth.

Furthermore, when a communication delay period is smaller than a preset threshold (when the communication quality has not decreased), the mobile object control apparatus 10 can detect the position of a mobile object 20 with high accuracy. When a communication delay period is larger than or equal to the preset threshold (when the communication quality has decreased), the mobile object control apparatus 10 cannot detect the position of a mobile object 20 correctly. For example, assume a case where a mobile object 20 travels in one direction at 1 [m] per second, and the mobile object control apparatus 10 receives mobile object position information from the mobile object 20 with a communication delay period of 10 [seconds]. In this case, the mobile object 20 is 10 [m] ahead of the position (coordinates) indicated by the position information. Therefore, when the communication quality has decreased, a displacement occurs in the position of the mobile object 20. This increases the possibility of a collision between mobile objects 20.

The area information is information used to extract mobile objects 20 other than a target mobile object 20 that are present near the location of the target mobile object 20. The area information is information indicating a preset range, and is generated by a user and the like and stored in the storage unit.

The range may be, for example, a range which is centered at the position (coordinates) of the target mobile object 20 and which is within a certain distance therefrom, a range that has been set to include the position (coordinates) of the target mobile object 20, or a range indicating a floor of a factory, a logistic facility, and the like.

Intra-area mobile object information 81 is information related to the position information of mobile objects 20 that are present in an area set by the area information. FIG. 8 depicts information indicating one example of a data structure of the intra-area mobile object information.

As exemplarily illustrated in FIG. 8, in the intra-area mobile object information 81, the following are associated with one another: area identification information, "area ID", for identifying an area corresponding to a target mobile object 20 (mobile object A); mobile object identification information, "mobile object ID", for identifying mobile objects 20 inside the area; obtainment date/time information, "obtainment date/time", indicating the dates/times of obtainment of the position information of mobile objects 20 inside the area; information, "coordinates", indicating the position information of mobile objects 20 inside the area; and route identification information, "route ID", for identifying the routes on which mobile objects 20 are present.

Note that the intra-area mobile object information 81 may not include the route identification information. The purpose of including the route identification information in the intra-area mobile object information 81 is to, for example, make it easy to distinguish the direction in which a mobile object proceeds when the mobile object has arrived at an intersecting point where a plurality of travel routes intersect.

The intra-area mobile object information may be generated with respect to a mobile object 20 with use of the area information as stated earlier, or may be generated with respect to an area that has been set in advance in a factory, a facility, and the like.

In a case where the intra-area mobile object information is generated with respect to a set area, for example, when a mobile object 20 enters the set area, a sensor apparatus installed in the area may detect the mobile object 20, generate the intra-area mobile object information with respect to the detected mobile object, and transmit the generated intra-area mobile object information to the mobile object control apparatus 10. Alternatively, when a mobile object 20 enters the area, the mobile object 20 may recognize information related to the area from a tag installed at an entrance of the area, generate the intra-area mobile object information with use of the identified information, and transmit the generated intra-area mobile object information to the mobile object control apparatus 10. The tag is, for example, a QR (Quick Response) Code® and the like.

A mobile object 20 may request the mobile object control apparatus 10 to transmit the intra-area mobile object information to this mobile object 20. The request may be made at a timing at which the mobile object 20 enters an area including an intersection where there is a possibility of a collision, may be made at a timing at which a specific tag is read, may be made at a timing at which some kind of task is ended, or may be made regularly.

A description is now given of the mobile object control apparatus.

The prediction unit 11 predicts a mobile object 20 (mobile object B) that has a high possibility of colliding with a target mobile object 20 (mobile object A) at an intersection. Hereinafter, for the sake of convenience, the target mobile object 20 (first mobile object) may be referred to as a mobile object A, and the mobile object 20 (second mobile object) that has a high possibility of colliding with the target mobile object 20 may be referred to as a mobile object B.

When there is a mobile object B that has a high possibility of colliding with the target mobile object A, the prediction unit 11 predicts the time of arrival at the intersection with respect to each of the mobile object A and the mobile object B. Specifically, the prediction unit 11 predicts the time at which the mobile object A will arrive at the intersection based on route information indicating a route by which the mobile object A travels, position information indicating the position of the mobile object A, intersection position information indicating the position of the intersection that is present on this route, and speed information indicating the speed of the mobile object A.

The prediction unit 11 predicts the time at which the mobile object B will arrive at the intersection based on route information indicating the route along which the mobile object B travels, position information indicating the position of the mobile object B, intersection position information indicating the position of the aforementioned intersection that is present on this route, and set speed information corresponding to the mobile object B. Note that the details of the prediction unit 11 will be described later.

The calculation unit 12 predicts whether the mobile object A can pass through the intersection before the time at which the mobile object B will arrive at the intersection. When it is predicted that the mobile object A cannot pass through the intersection, the calculation unit 12 calculates a speed of the mobile object A in accordance with a collision avoidance condition in order to avoid a collision with the mobile object B.

The collision avoidance condition is denoted by using, for example, distance information indicating a distance between the mobile objects, namely between the mobile object A and the mobile object B that has a high possibility of colliding with the mobile object A (="the difference between a path (e.g., distance) between the mobile object A and the intersection and a path (e.g., distance) between the mobile object B and the intersection"), the braking distance of the mobile object A, and the set speed information and the communication delay period of the mobile object B. Note that the details of the calculation unit 12 will be described later.

The communication unit 13 communicates with the communication unit 21 of a mobile object 20. Specifically, in the systems 100a and 100b described in the aforementioned (1) and (2), the communication unit 13 transmits, for example, instruction information indicating an instruction for controlling traveling of a mobile object 20 to the mobile object 20.

Also, in the system 100a of (1), the communication unit 13 receives mobile object position information and the like from a mobile object 20.

The instruction unit 14 generates instruction information for controlling a mobile object 20 to travel to a target place, and transmits this instruction information to the mobile object 20 via the communication unit 13. The instruction information includes, for example, information for causing the mobile object 20 to accelerate or decelerate and the like. Note that the details of the instruction unit 14 will be described later.

A description is now given of a mobile object.

The communication unit 21 communicates with the communication unit 13 of the mobile object control apparatus 10. Specifically, in the system 100a of (1), the communication unit 21 transmits mobile object position information and the like to the mobile object control apparatus 10. Also, in the systems 100a and 100b of (1) and (2), the communication unit 21 receives, for example, instruction information for controlling traveling of the mobile object 20 from the mobile object control apparatus 10.

The sensor unit 22 is, for example, a sensor that detects a state of the mobile object 20, a target object (e.g., a tray, a shelf, and the like), a sign that assists traveling of the mobile object 20, and an obstacle on a travel route. Specifically, the sensor unit 22 includes at least one of such apparatuses as a radar, an ultrasound sensor, an image capture device, a gyroscope, an encoder, and a GPS (Global Positioning System).

The position prediction unit 23 predicts the position of the mobile object 20 itself Specifically, the position prediction unit 23 obtains measurement information indicating the result of measurement performed by the sensor unit 22, predicts the position of the mobile object 20 itself based on the obtained measurement information, and generates mobile object position information indicating the predicted position.

The travel control unit 24 controls the travel unit 25 included in the mobile object 20. In other words, the travel control unit 24 controls the travel unit 25 for controlling traveling of the mobile object 20. Specifically, the travel control unit 24 controls the travel unit 25 with use of the aforementioned pieces of information and the like. That is to say, the travel control unit 24 performs control so that the mobile object 20 travels to a target place. The travel control unit 24 controls the mechanisms included in the mobile object 20.

The travel unit 25 is a device that causes the mobile object 20 to travel. Specifically, in a case where the mobile object 20 is, for example, an automated guided vehicle or an electric vehicle, the travel unit 25 is means used in traveling of the vehicle, such as a motor, wheels (or crawlers), and a battery.

Below is a detailed description of the prediction unit.

The collision prediction unit 15 predicts a mobile object 20 that has a high possibility of colliding with a target mobile object 20 at an intersection.

Specifically, the collision prediction unit 15 obtains mobile object position information from each of mobile objects 20. Using the mobile object position information of the target mobile object 20 and the area information, the collision prediction unit 15 extracts mobile objects 20 that are present in an area in which the target mobile object 20 is present. Thereafter, the collision prediction unit 15 generates intra-area mobile object information related to the extracted mobile objects 20, which is exemplarily illustrated in FIG. 8, and stores the generated intra-area mobile object information into the storage unit.

The collision prediction unit 15 further extracts, from the mobile objects 20 that are present in this area, mobile objects 20 that cannot be detected even with use of the sensor unit 22 of the target mobile object 20 (mobile objects 20 that are in a blind spot of the target mobile object 20).

With reference to the route information, the collision prediction unit 15 further extracts, from the mobile objects 20 that cannot be detected even with use of the sensor unit 22 of the target mobile object 20, a mobile object 20 that has not yet arrived at an intersection to which the target mobile object 20 is traveling, and selects the extracted mobile object 20 as a collision prediction target.

With reference to the communication delay information, the collision prediction unit 15 obtains communication delay period information corresponding to the mobile object 20 that has been selected as the collision prediction target. When this transmission delay period information is larger than or equal to a preset threshold, the collision prediction unit 15 determines that the communication quality has decreased, and predicts that the selected mobile object 20 is a mobile object 20 that has a high possibility of colliding with the target mobile object 20 at the intersection. The threshold is obtained through, for example, an experiment and a simulation.

The transmission delay period may be, for example, an average value, an intermediate value, a worst value, variation, and the like of transmission delay periods in a predetermined period.

Also, the collision prediction unit 15 may determine that the communication quality has decreased when a region of the position at which the mobile object B can be present (e.g., a region that is covered when the mobile object B is assumed to have traveled in every travelable direction from the position that was obtained last at the maximum speed during (the current time−the time at which the position was obtained last+the transmission delay period)) has expanded by at least a certain size (e.g., a length, a radius, or an area of the region).

Note that in a case where the sensor unit 22 of the target mobile object 20 can detect the mobile object 20 that has a high possibility of collision with restoration of the communication quality, the collision is avoided using a collision avoidance technique. Examples of the collision avoidance technique include priority control based on FIFO (First In First Out) at the intersection and the like. In other words, the collision avoidance technique is, for example, a technique to perform control so that a mobile object that has arrived at the intersection first passes through the intersection before a mobile object that arrives at the intersection later.

In a case where it is predicted that there is a mobile object 20 that has a high possibility of colliding with the target mobile object 20, the arrival time prediction unit 16 predicts the time of arrival at the intersection with respect to the target mobile object 20 and the mobile object 20 that has a high possibility of colliding with the target mobile object 20 with reference to the mobile object setting information.

Specifically, the arrival time prediction unit 16 predicts the time at which the target mobile object A will arrive at the intersection based on route information indicating the route along which the target mobile object A travels, position information indicating the position of the target mobile object A, intersection position information indicating the position of the intersection that is present on this route, and speed information indicating the speed of the target mobile object A.

The arrival time prediction unit 16 predicts the time at which the mobile object B, which has a high possibility of colliding with the target mobile object A, will arrive at the intersection based on route information indicating the route along which the mobile object B travels, position information indicating the position of the mobile object B, intersection position information indicating the position of the intersection that is present on this route, and set speed information indicating the set speed of the mobile object B.

Below is a detailed description of the calculation unit.

The passing prediction unit 17 predicts whether the target mobile object 20 can pass through the intersection before the time at which the mobile object 20 that has a high possibility of colliding with the target mobile object 20 will arrive at the intersection.

When it is predicted that the target mobile object 20 cannot pass through the intersection, the collision avoidance speed calculation unit 18 calculates a speed of the target mobile object 20 based on a collision avoidance condition indicated by Expression 1.

$$\text{Distance } Dab - \text{braking distance } Dsa > \text{transmission delay period } Tb \times \text{set speed } Vb \quad \text{[Expression 1]}$$

Dab: a distance between the mobile objects A and B
Dsa: the braking distance of the mobile object A
Tb: the transmission delay period of the mobile object B
Vb: the set speed of the mobile object B Specifically, as the travel speed of the mobile object B cannot be controlled with high accuracy due to a decrease in the communication quality, the travel speed of the target mobile object A is changed so that the difference between the distance Dab and the braking distance Dsa satisfies the collision avoidance condition indicated by Expression 1.

The distance Das between the mobile objects A and B is, for example, a distance indicating the difference between a distance from the mobile object A to the intersection along a travel route (that is to say, a course from the mobile object A to the intersection) and a distance from the mobile object B to the intersection along a travel route (that is to say, a course from the mobile object B to the intersection). In other words, this distance is a distance from the mobile object A to the mobile object B via the intersection.

The collision avoidance speed calculation unit 18 calculates the travel speed of the mobile object A, assuming, for example, that the maximum speed Vmax of the mobile object B is set as the set speed Vb of the mobile object B in Expression 1. In this way, even in a case where the mobile object B travels to the intersection at the maximum speed Vmax, the distance Dab can be maintained to be longer than the braking distance Dsa, and thus the collision can be avoided.

Also, in a case where the travel route is congested, or in a case where it is difficult to increase the distance Dab, the collision avoidance speed calculation unit 18 may reduce the braking distance Dsa, that is to say, lower the speed of the target mobile object A. The braking distance Dsa is reduced by lowering the speed.

Also, in a case where the number of mobile objects 20 operating inside the area is small, the collision avoidance speed calculation unit 18 may increase the distance Dab by temporarily lowering the speed of the target mobile object A, and thereafter restore the original speed.

Furthermore, the collision avoidance speed calculation unit 18 may lower the speed of the target mobile object A while increasing the distance Dab within a range in which Expression 1 is satisfied.

Note that to provide more safety, various factors, such as a safety rate, may be added to Expression 1. For example, as indicated by Expression 2, the left side of Expression 1 is multiplied by a safety rate S with a value smaller than 1.0 (e.g., S=0.8). In this way, the distance Dab is further increased (e.g., the inter-vehicular distance is increased), and the braking distance Dsa is reduced (i.e., the speed of the mobile object A is lowered; this is because lowering the speed generally reduces the braking distance), thereby further increasing safety.

$$S \times (\text{distance } Dab - \text{braking distance } Dsa) > \text{transmission delay period } Tb \times \text{set speed } Vb \quad \text{[Expression 2]}$$

Figure 9:
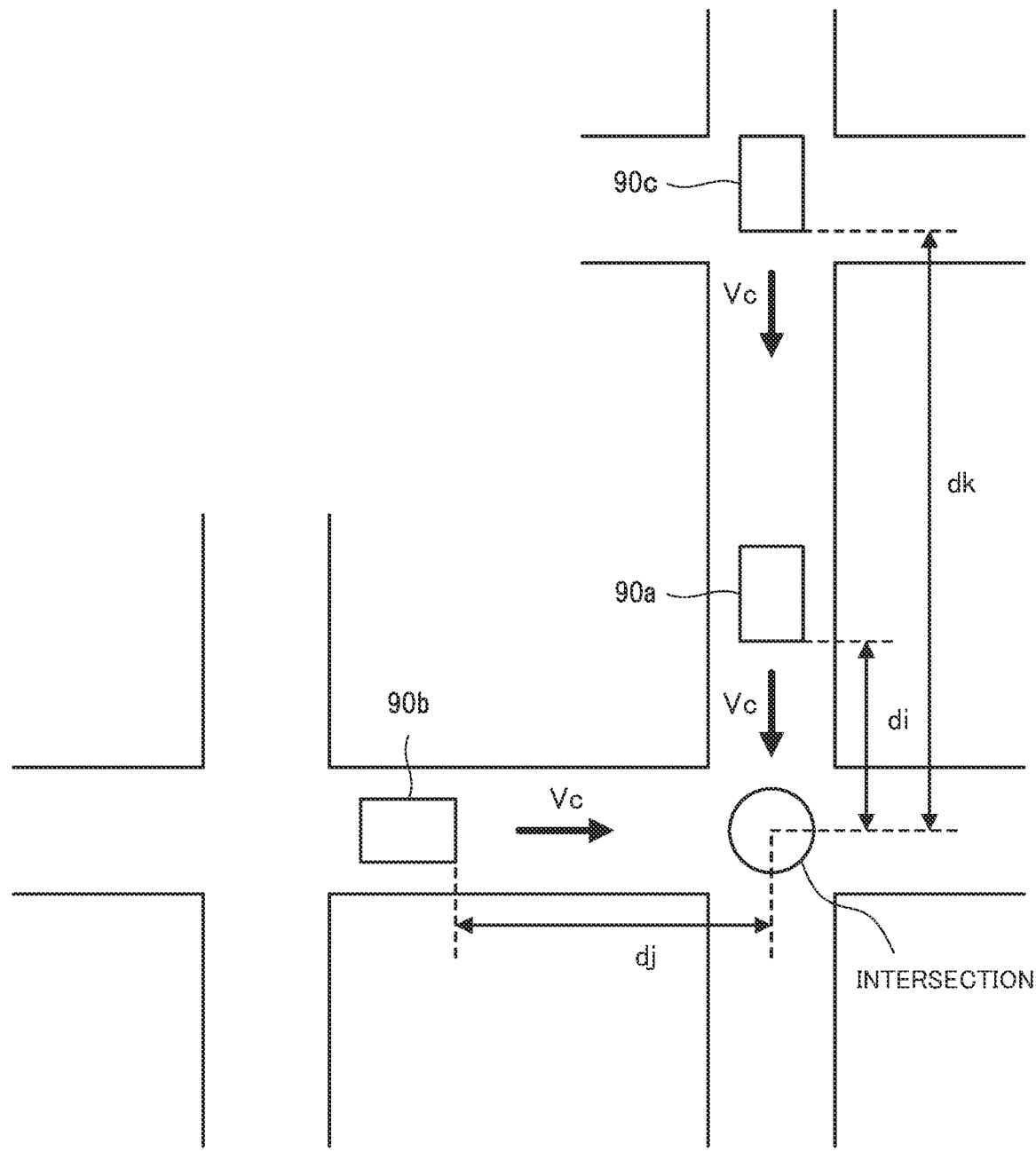
FIG. 9 is a diagram illustrating one example of a system that controls transport of automated guided vehicles.

The following describes an example embodiment with use of FIG. 9.

FIG. 9 is a diagram illustrating one example of a system that controls transport of automated guided vehicles. Note that FIG. 9 will be described using a case where automated guided vehicles 90 are used as mobile objects 20.

In a normal operation (without a decrease in the communication quality), in order to improve the throughput of the automated guided vehicles 90 at an intersection where traffic congestion easily occurs, the automated guided vehicles 90 illustrated in FIG. 9 are controlled to temporarily form a virtual platoon in the vicinity of the intersection (platooning).

Also, in a case where a platoon is formed, a plurality of automated guided vehicles 90 that are heading toward the same intersection are controlled to travel at the same cruise speed Vc at the same inter-vehicular distance D in the vicinity of this intersection. Note that a short distance is set as the inter-vehicular distance D in order to achieve better fuel economy in platooning by reducing the area occupied by the mobile objects 20 on the route and reducing air resistance.

In the example of FIG. 9, the path (e.g., distance) from an automated guided vehicle 90a that is closest to the intersection to this intersection is di, and control is performed so that the path (e.g., distance) from an automated guided vehicle 90b that is closest to this intersection next to the automated guided vehicle 90a to this intersection is dj (=di+D). Also, control is performed so that the path (e.g., distance) from an automated guided vehicle 90c that is closest to this intersection next to the automated guided vehicle 90b to this intersection is dk (=di+2D).

As a result of performing the foregoing control, as long as the transmission delay periods are smaller than the threshold and the positions of the automated guided vehicles 90 can be detected, the interval at which the automated guided vehicles 90 enter the intersection becomes constant, and the automated guided vehicles 90 can pass through the intersection without changing the speeds thereof relative to one another.

However, if the transmission delay periods increase due to a decrease in the communication quality, the accuracy of position information of the automated guided vehicles 90 decreases, thereby increasing the possibility of a collision between automated guided vehicles 90 at the intersection. For this reason, there are cases where each time the communication quality decreases, the automated guided vehicles 90 are brought to an emergency stop, or the systems 100 are stopped completely, in order to secure safety.

However, although the decrease in the communication quality occurs oftentimes, the decrease recovers in a relatively short amount of time; thus, bringing the automated guided vehicles 90 into an emergency stop, or stopping the systems 100 completely, will reduce the transport efficiency.

In view of this, in a case where the communication quality has decreased, speeds that can avoid a collision are set as the speeds of the automated guided vehicles 90.

For example, assume a case where, when the speed of each automated guided vehicle 90 is the maximum speed $V$max, the communication delay period of the automated guided vehicle 90b became larger than or equal to the threshold due to a decrease in the communication quality in FIG. 9. In this case, as the automated guided vehicle 90a that is closer to the intersection than the automated guided vehicle 90b can pass through the intersection before the arrival of the automated guided vehicle 90b, the automated guided vehicle 90a is caused to travel at the speed Vc.

In contrast, as the controllable automated guided vehicle 90c has a possibility of colliding with the automated guided vehicle 90b at the intersection, calculation is performed to yield a speed of the automated guided vehicle 90b under which the inter-vehicular distance Dbc between the automated guided vehicle 90c and the automated guided vehicle 90b (=the difference between the path (e.g., distance) between the automated guided vehicle 90c and the intersection) and the path (e.g., distance) between the automated guided vehicle 90b and the intersection) and the braking distance Dsc of the automated guided vehicle 90c satisfies a collision avoidance condition indicated by Expression 3.

Distance $Dbc$–braking distance $Dsc$>transmission delay period $Tb$×speed $V$max     [Expression 3]

Dbc: inter-vehicular distance between the automated guided vehicles 90b and 90c

Dsa: the braking distance of the automated guided vehicle 90c

Tb: the transmission delay period of the mobile object B

Vmax: the maximum speed of the mobile object B

However, in a case where the accuracy of position information of the automated guided vehicle 90b has been increased by restoration of the communication quality halfway through, or in a case where the sensor unit 22 of the automated guided vehicle 90c has been able to detect the automated guided vehicle 90b passing through the intersection, the automated guided vehicle 90c ends control for satisfying the collision avoidance condition and makes a transition to normal processing. That is to say, the automated guided vehicle 90c restarts control for maintaining the original inter-vehicular distance D and the original speed Vc.

Consequently, the transport efficiency that has been reduced to avoid the collision can be restored to the transport efficiency of the original level. Note that although FIG. 9 illustrates an example that uses platooning of the automated guided vehicles 90, the foregoing method can be applied to a case where the communication quality has decreased even if platooning is not used.

Below is a detailed description of the instruction unit 14.

The instruction unit 14 generates instruction information used for instructing a target mobile object 20 to decelerate based on the calculated speed of the target mobile object 20 that satisfies the expression of the collision avoidance condition.

Note that deceleration may be acceleration of a predetermined magnitude. Also, deceleration may be acceleration (with a negative sign) of the maximum magnitude within a permitted range. Furthermore, the absolute value of acceleration may be increased in a case where the difference obtained by subtracting the braking distance of the target mobile object 20 from the distance between the target mobile object 20 and a mobile object 20 that has a high possibility of colliding with the target is smaller than a product of the communication delay period and the maximum speed of the mobile object 20 that has a high possibility of the collision.

In addition, the absolute value of acceleration may be reduced in a case where the difference obtained by subtracting the braking distance of the target mobile object 20 from the distance between the target mobile object 20 and the mobile object 20 that has a high possibility of colliding with the target is close to the product of the communication delay period and the maximum speed of the mobile object 20 that has a high possibility of the collision. The purpose thereof is to prevent overshoot.

[Apparatus Operations]

Figure 10:
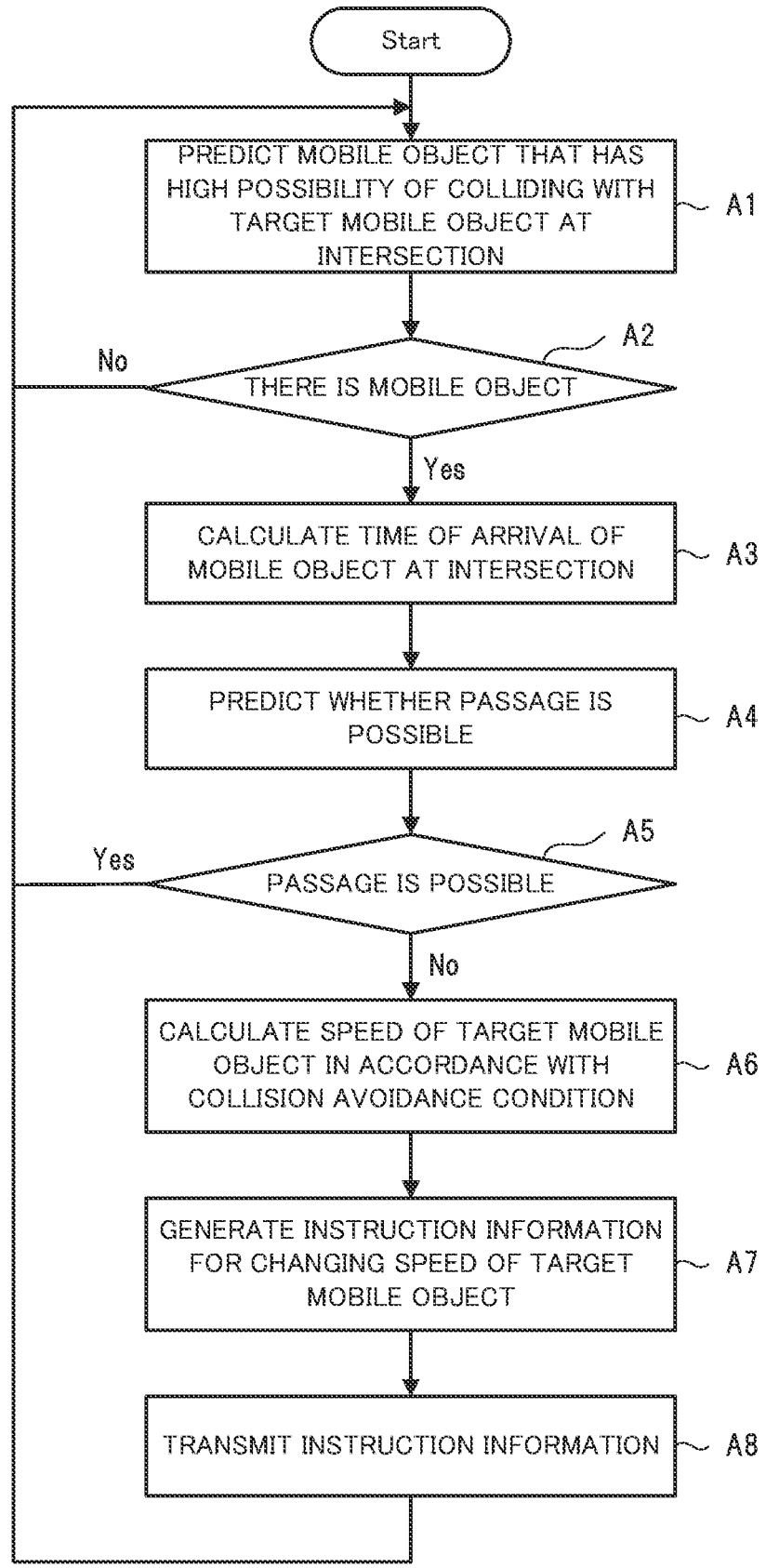
FIG. 10 is a diagram illustrating example operations of the mobile object control apparatus.

Next, using FIG. 10, a description is given of the operations of the mobile object control apparatus according to the first example embodiment of the present invention. FIG. 10 is a diagram illustrating example operations of the mobile object control apparatus. In the following description, FIGS. 2 to 9 will be referred to as appropriate. Also, in the present first example embodiment, a mobile object control method is executed by causing the mobile object control apparatus to operate. Therefore, the following description of the operations of the mobile object control apparatus applies to the mobile object control method according to the present first example embodiment.

As illustrated in FIG. 10, the prediction unit 11 predicts a mobile object 20 (mobile object B) that has a high possibility of colliding with a target mobile object 20 (mobile object A) at an intersection (step A1).

Specifically, in step A1, the collision prediction unit 15 of the prediction unit 11 first obtains mobile object position information from each mobile object 20. Subsequently, in step A1, using the mobile object position information of the target mobile object 20 and the area information, the collision prediction unit 15 extracts mobile objects 20 that are present in an area corresponding to the target mobile object 20. Thereafter, the collision prediction unit 15 generates intra-area mobile object information related to the extracted mobile objects 20, which is illustrated in FIG. 8, and stores the generated intra-area mobile object information into the storage unit.

In step A1, the collision prediction unit 15 further extracts, from the mobile objects 20 that are present in this area, mobile objects 20 that cannot be detected even with use of the sensor unit 22 of the target mobile object 20 (mobile objects 20 that are in a blind spot).

In step A1, with reference to the route information, the collision prediction unit 15 further extracts, from the mobile objects 20 that cannot be detected even with use of the sensor unit 22 of the target mobile object 20, a mobile object 20 that has not yet arrived at an intersection to which the target mobile object 20 is traveling, and selects the extracted mobile object 20 as a collision prediction target.

In step A1, with reference to the communication delay information, the collision prediction unit 15 obtains communication delay period information corresponding to the mobile object 20 that has been selected as the collision prediction target. When this transmission delay period information is larger than or equal to a preset threshold, the collision prediction unit 15 determines that the communication quality has decreased, and predicts that the selected mobile object 20 is a mobile object 20 that has a high possibility of colliding with the target mobile object 20 at the intersection. The threshold is obtained through, for example, an experiment and a simulation.

When there is a mobile object B that has a high possibility of colliding with the target mobile object A (step A2: Yes), the prediction unit 11 predicts the time of arrival at the intersection with respect to each of the mobile object A and the mobile object B (step A3). On the other hand, when there is no mobile object B that has a high possibility of colliding with the target mobile object A (step A2: No), the prediction unit 11 proceeds to processing of step A1.

Specifically, in step A3, the arrival time prediction unit 16 of the prediction unit 11 predicts the time at which the target mobile object A will arrive at the intersection based on route information indicating the route corresponding to the target mobile object A, position information indicating the position of the target mobile object A, intersection position information indicating the position of the intersection that is present on this route, and speed information indicating the speed of the target mobile object A.

Also, in step A3, the arrival time prediction unit 16 predicts the time at which the mobile object B, which that has a high possibility of colliding with the target mobile object A, will arrive at the intersection based on route information indicating the route corresponding to the mobile object B, position information indicating the position of the mobile object B, intersection position information indicating the position of the intersection that is present on this route, and set speed information indicating the set speed of the mobile object B.

The calculation unit 12 predicts whether the mobile object A can pass through the intersection before the time at which the mobile object B will arrive at the intersection (step A4). Specifically, in step A4, the passing prediction unit 17 predicts whether the target mobile object A can pass through the intersection before the time at which the mobile object B that has a high possibility of colliding with the target mobile object A will arrive at the intersection.

When it is predicted that the mobile object A cannot pass through the intersection (step A5: No), the calculation unit 12 calculates a speed of the mobile object A in accordance with a collision avoidance condition in order to avoid a collision with the mobile object B (step A6). On the other hand, when it is predicted that the mobile object A can pass through the intersection (step A5: Yes), the calculation unit 12 proceeds to processing of step A1.

Specifically, as the travel speed of the mobile object B cannot be controlled with high accuracy due to a decrease in the communication quality, the calculation unit 12 changes the travel speed of the target mobile object A, whose travel speed is controllable, so that the difference between the distance Dab and the braking distance Dsa satisfies the collision avoidance condition indicated by Expression 1.

The calculation unit 12 calculates the travel speed of the mobile object A, assuming, for example, that the maximum speed Vmax of the mobile object B is set as the set speed Vb of the mobile object B in Expression 1. In this way, even in a case where the mobile object B travels to the intersection at the maximum speed Vmax, the distance Dab is maintained to be longer than the braking distance Dsa, and thus the collision is avoided.

Also, in a case where the travel route is congested, or in a case where it is difficult to increase the distance Dab, the calculation unit 12 may reduce the braking distance Dsa, that is to say, lower the speed of the target mobile object A. The braking distance Dsa is reduced by lowering the speed.

Also, in a case where the number of mobile objects 20 operating inside the area is small, the calculation unit 12 may increase the distance Dab by temporarily lowering the speed of the target mobile object A, and thereafter restore the original speed.

Furthermore, the calculation unit 12 may lower the speed of the target mobile object A while increasing the distance Dab within a range in which Expression 1 is satisfied.

Note that to provide more safety, various factors, such as the safety rate indicated by Expression 2, may be added.

The instruction unit 14 generates instruction information used for instructing the target mobile object A to decelerate based on the calculated speed of the target mobile object A that satisfies the expression of the collision avoidance condition (step A7). The communication unit 13 obtains the instruction information generated by the instruction unit 14, and transmits this instruction information to the target mobile object A (step A8).

Thereafter, upon receiving this instruction information, the target mobile object A lowers the speed thereof in accordance with this instruction information. In this way, the target mobile object A avoids a collision with the mobile object B at the intersection.

Also, in a case where the mobile object A can pass through before the mobile object B even at a speed other than the maximum speed, in order to improve fuel economy, the instruction unit 14 may instruct the mobile object A to accelerate to the minimum speed within the range in which the mobile object A can pass through. Note that the instruction unit 14 may not issue the instruction for acceleration when acceleration is not particularly necessary.

Also note that in a case where the sensor unit 22 of the target mobile object 20 can detect the mobile object 20 that has a high possibility of collision with restoration of the communication quality, the collision is avoided using a collision avoidance technique. Examples of the collision avoidance technique include priority control based on FIFO at the intersection and the like.

Effects of Present Example Embodiment

As described above, according to the present first example embodiment, even if a communication delay has occurred due to a decrease in the communication quality, the speed of the first mobile object can be changed in consideration of the communication delay period of the second mobile object, and thus the collision between the mobile objects can be avoided without stopping the first mobile object and the second mobile object. Therefore, even in a case where the communication quality has decreased, a reduction in the travel efficiency of the mobile objects can be suppressed.

First Example Modification

Figure 11:
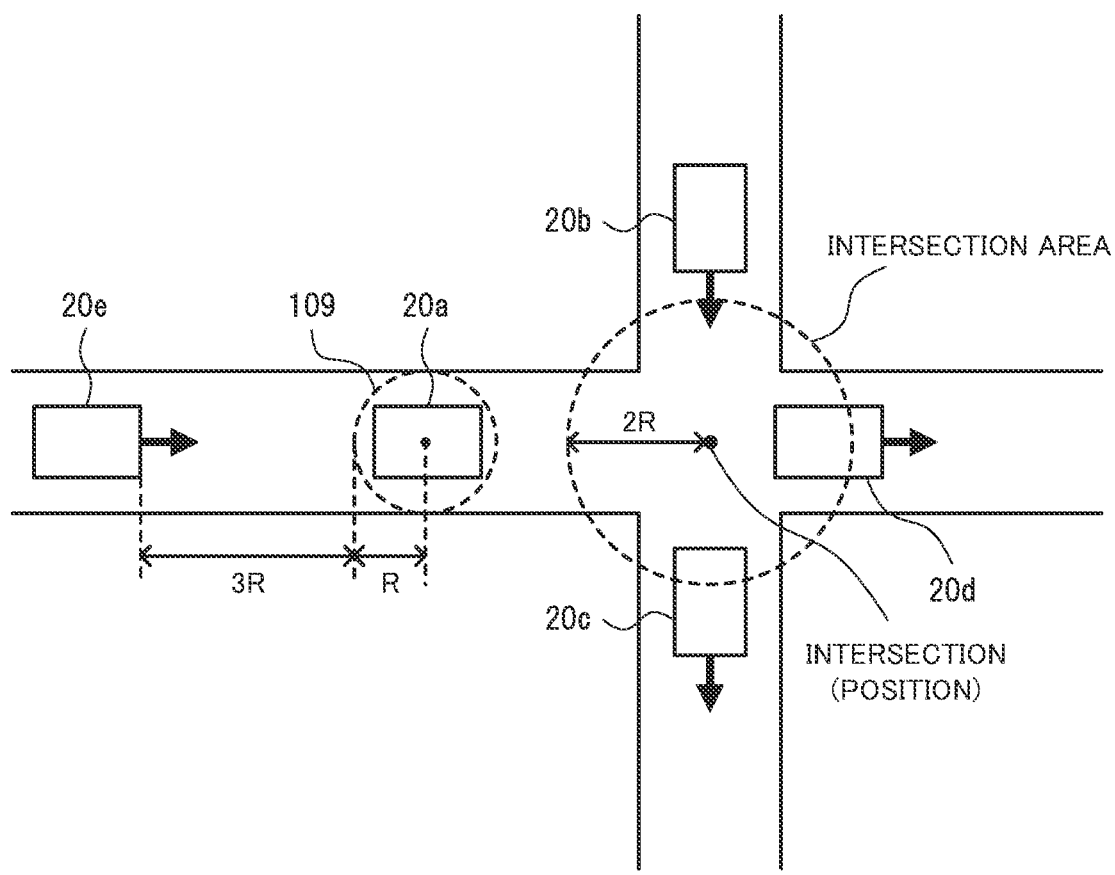
FIG. 11 is a diagram for describing a first example modification.

A description is now given of a first example modification with use of FIG. 11. FIG. 11 is a diagram for describing the first example modification.

In the first example modification, the mobile object control apparatus 10 is provided with a function of avoiding a collision in consideration of the shapes and dimensions of mobile objects 20, in addition to the functions described in the first example embodiment. That is to say, processing for predicting a mobile object 20 that has a high possibility of colliding with a target mobile object 20 with use of an intersection area that has been conceptually set for a target intersection is added to the collision prediction unit 15 of the prediction unit 11 described in the first example embodiment.

The intersection area is decided on through an experiment, a simulation, and the like based on, for example, the position (coordinates) that is set for an intersection in advance, the shapes of mobile objects 20, the dimensions of mobile objects 20, the widths of routes, and the path difference (e.g., distance) between mobile objects 20. However, the intersection area is not limited to the above-described area.

An intersection area illustrated in FIG. 11 is an area which is centered at a position that is set at an intersection in advance, and which is twice the radius R (R>0) of a circle 109 that includes a mobile object 20 (2R). The radius R denotes, for example, the radius of the smallest circle that includes the mobile object 20. It is sufficient that the intersection area be a value larger than the radius R; for instance, the intersection area may be set in accordance with a value that is, for example, 1.5 times or 2.3 times larger than the radius R. In the example of FIG. 11, the path difference (e.g., distance) between mobile objects 20 is set to be three times larger than the radius R (3R).

Also, although the mobile objects 20 (20a, 20b, 20c, 20d, 20e) are assumed to have the same shape and dimension, different mobile objects 20 may have different shapes and dimensions. In a case where different mobile objects 20 have different shapes and dimensions, the radius R may be set based on a mobile object 20 with the largest dimensions.

The operations of the first example modification will be described. The collision prediction unit 15 extracts the mobile objects 20c and 20d which have passed through the intersection and which remain in the intersection area that is set in advance at the intersection through which the target mobile object 20a will pass, and selects the extracted mobile objects 20c and 20d as targets with which the target mobile object 20a is predicted to collide.

That is to say, the collision prediction unit 15 extracts the mobile objects 20c and 20d that still remain in the intersection area after passing through this intersection by traveling straight, turning right, turning left, and the like, and selects the extracted mobile objects 20c and 20d as collision prediction targets for the target mobile object 20a. Note that although the mobile object 20b is not selected as the collision prediction target in the first example modification, the mobile object 20b is selected as the collision prediction target in the first example embodiment.

According to the first example modification, as a mobile object 20 that remains in an intersection area can be extracted, a blind area on the exit side of an intersection can be eliminated.

Second Example Modification

Figure 12:
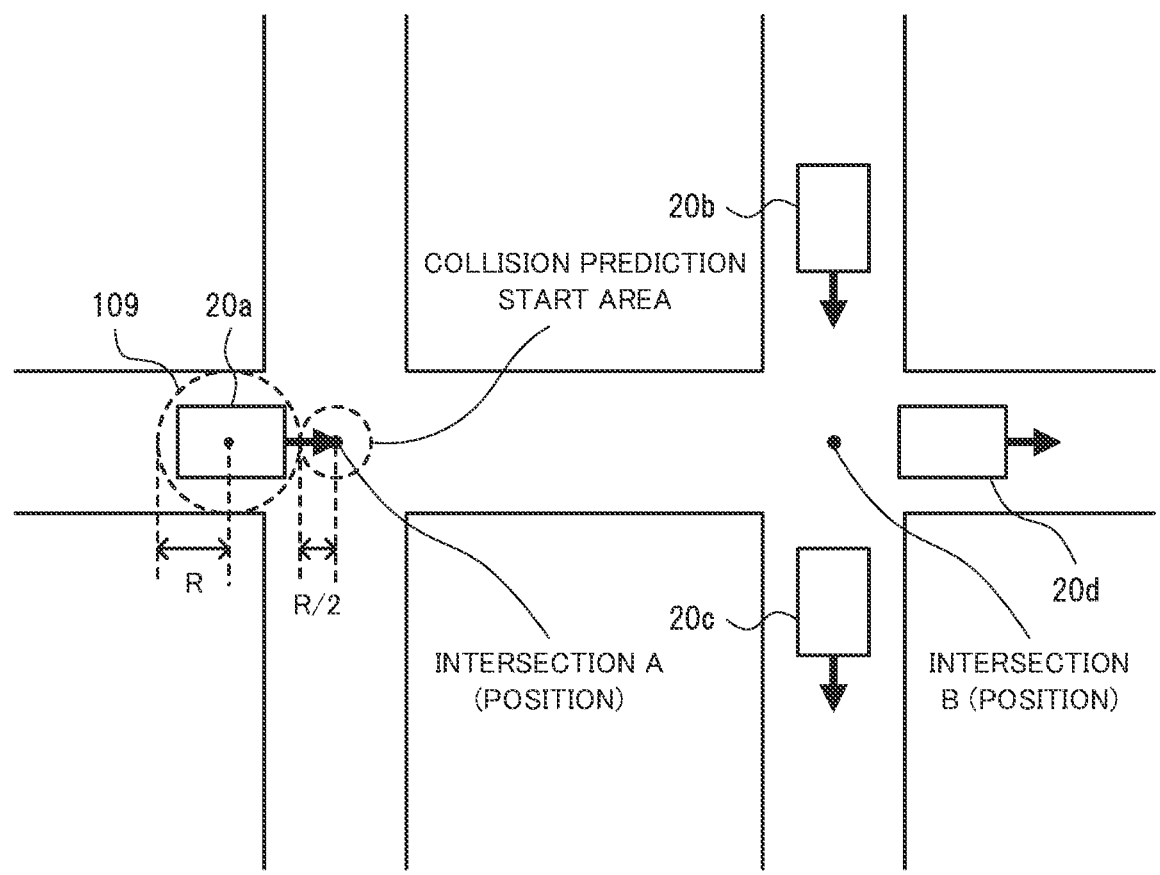
FIG. 12 is a diagram for describing a second example modification.

A description is now given of a second example modification with use of FIG. 12. FIG. 12 is a diagram for describing the second example modification.

In the second example modification, the mobile object control apparatus 10 is provided with a function of, when a mobile object 20a has approached an intersection first in a platoon, starting collision prediction with respect to the next target intersection B without waiting for passage through the target intersection A, in addition to the functions described in the first example embodiment. That is to say, processing for deciding on a timing to start collision prediction is added to processing of the collision prediction unit 15 of the prediction unit 11 described in the first example embodiment.

A collision prediction start area is decided on from an experiment, a simulation, and the like based on the position (coordinates) that is set at an intersection in advance, the shapes and dimensions of mobile objects 20, the widths of routes, and the distances between mobile objects 20. However, the intersection area is not limited to the above-described area.

A collision prediction start area illustrated in FIG. 12 is an area which is centered at a position that is set at an intersection in advance, and which is ½ times larger than the radius R of a circle 109 that includes a mobile object 20 (R/2). The radius R denotes, for example, the radius of the smallest circle that includes the mobile object 20. It is sufficient that the collision prediction start area be a value smaller than the radius R; for instance, the collision prediction start area may be set in accordance with a value that is, for example, 0.3 times or 0.7 times larger than the radius R. Note that the distance between mobile objects 20 is set to be three times larger than the radius R (3R).

Also, although the mobile objects 20 (20a, 20b, 20c, 20d) are assumed to have the same shape and dimension, different mobile objects 20 may have different shapes and dimensions. In a case where different mobile objects 20 have different shapes and dimensions, the radius R may be set based on a mobile object 20 with the largest dimensions.

The operations of the second example modification will be described. In a case where the target mobile object 20a has entered a collision prediction start area that is set in advance for the intersection A that is used in current collision prediction, the collision prediction unit 15 switches the target intersection from the intersection A to the intersection B that is to be used in the next collision prediction.

According to the second example modification, in a case where the target mobile object 20a has entered a collision prediction start area, the target intersection can be switched, and thus the start of collision prediction can be hastened. Therefore, according to the second example modification, as collision prediction is started at a sooner timing, the operation of avoiding a collision can be controlled flexibly. As a result, according to the second example modification, a reduction in the travel efficiency of mobile objects can be suppressed.

Third Example Modification

Figure 13:
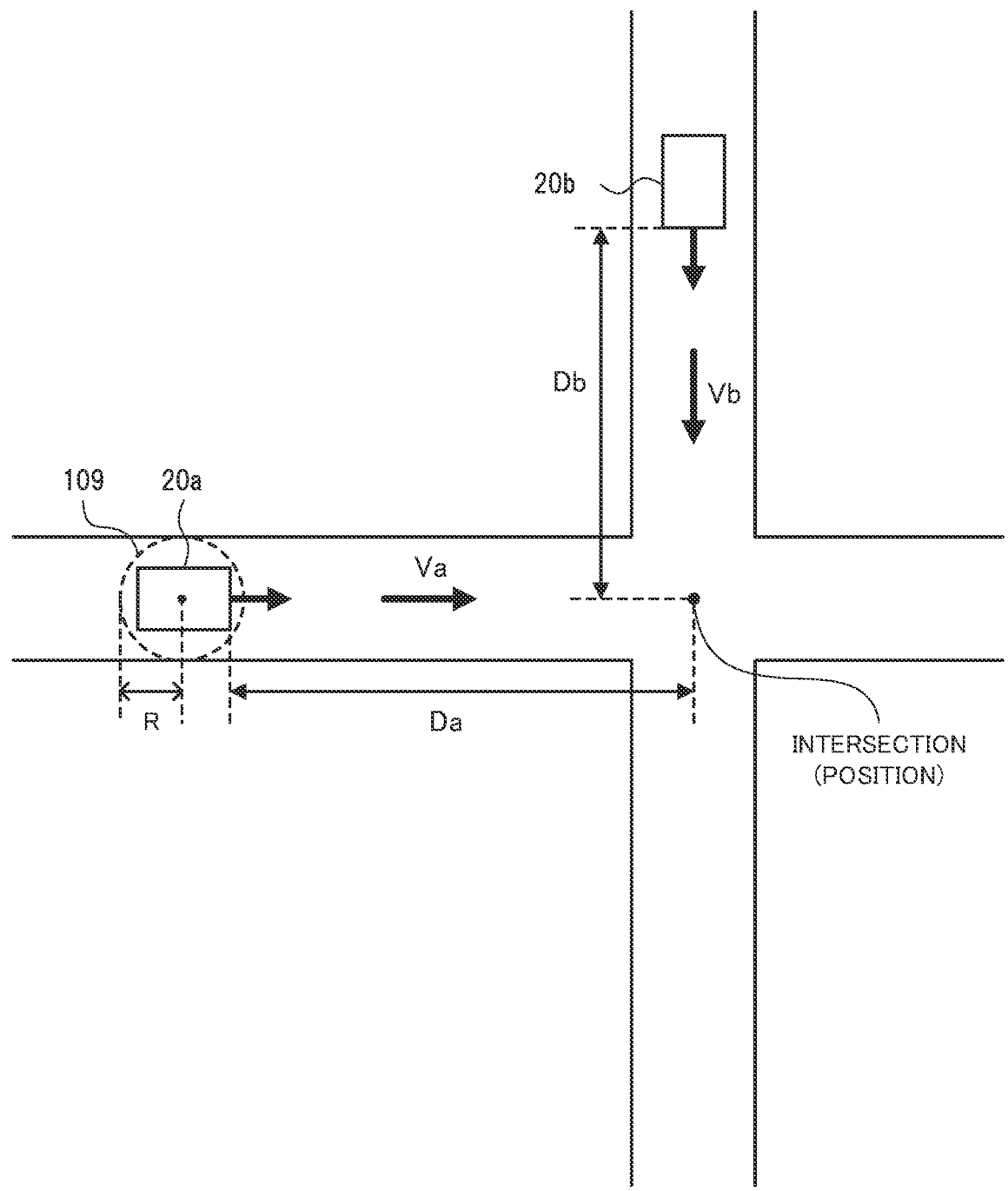
FIG. 13 is a diagram for describing a third example modification.

A description is now given of a third example modification with use of FIG. 13. FIG. 13 is a diagram for describing the third example modification.

In the third example modification, the mobile object control apparatus 10 is provided with a function of avoiding a collision between mobile objects 20 and a deadlock even in a case where there has been a prediction error in the predicted positions of mobile objects 20 due to a communication delay, in addition to the functions described in the first example embodiment. That is to say, processing for avoiding a collision and a deadlock caused by a communication delay is added to processing of the collision avoidance speed calculation unit 18 of the calculation unit 12 described in the first example embodiment.

The operations of the third example modification will be described.

Specifically, the collision avoidance speed calculation unit 18 obtains priority degree information indicating a priority degree of a mobile object 20b (mobile object B) that has a high possibility of colliding with a target mobile object 20a (mobile object A).

Priority degree information is given by numbers corresponding to mobile objects 20. For the numbers, for example, integers larger than or equal to one can be associated in descending order of priority degrees. However, the numbers are not limited to integers larger than or equal to one; it is sufficient that the numbers indicate priority degrees.

The collision avoidance speed calculation unit 18 calculates a speed Va at which the mobile object A can pass through an intersection before the mobile object B based on a collision avoidance condition indicated by Expression 4 in a case where the priority degree of the mobile object A is higher than the priority degree of the mobile object B, the mobile object A can pass through the intersection before the time at which the mobile object B will arrive at the intersection, and the difference between the path from the mobile object A to the intersection (e.g., a distance Da) and the path from the mobile object B to the intersection (e.g., a distance db) is smaller than or equal to a preset threshold.

$$\text{Set speed } Va > \text{distance } Da \div (\text{distance } db \div \text{set speed } Vb) \quad \text{[Expression 4]}$$

Da: a distance between the mobile object A and the intersection
db: a distance between the mobile object B and the intersection
Va: the set speed of the mobile object A
Vb: the set speed of the mobile object B The threshold is a threshold for determining whether to perform control in which a mobile object with a high priority degree passes (passes through the intersection before) a mobile object with a low priority degree. The threshold is, for example, a distance that is ½ times larger than the radius R (R>0) of a circle 109 that includes the mobile object 20a (R/2), and is obtained through an experiment and a simulation.

Also, in a case where the difference between the path from the mobile object A to the intersection (e.g., the distance Da) and the path from the mobile object B to the intersection (e.g., the distance db) (e.g., the difference between the distances) is larger than the threshold, the collision avoidance speed calculation unit 18 calculates a speed Va at which the mobile object A can pass through the intersection before the mobile object B based on the collision avoidance condition indicated by Expression 4.

Furthermore, in a case where the difference between the paths is large, the collision avoidance speed calculation unit 18 may calculate a speed Va at which the mobile object A can pass through the intersection before the mobile object B based on the collision avoidance condition indicated by Expression 4 with a preset probability (e.g., once in four times). However, the probability is not limited to once in four times.

The reason why probability-based operations are performed in a case where the difference between the paths (e.g., the difference between the distances) is large is because a collision and a deadlock are not likely to occur even without performing priority-based control in a case where the difference between the paths is large, even if a prediction error has occurred due to a communication delay.

In addition, the collision avoidance speed calculation unit 18 calculates a speed Vb at which the mobile object B can pass through the intersection before the mobile object A based on a collision avoidance condition indicated by Expression 5 in a case where the priority degree of the mobile object A is lower than the priority degree of the mobile object B, the mobile object B can pass through the intersection before the time at which the mobile object A will arrive at the intersection, and the difference between the path from the mobile object A to the intersection (e.g., the distance Da) and the path from the mobile object B to the intersection (e.g., the distance db) is or smaller than or equal to the threshold.

$$\text{Set speed } Va < \text{distance } Da \div (\text{distance } db \div \text{set speed } Vb) \quad \text{[Expression 5]}$$

Da: a distance between the mobile object A and the intersection
db: a distance between the mobile object B and the intersection
Va: the set speed of the mobile object A
Vb: the set speed of the mobile object B Also, in a case where the difference between the path from the mobile object A to the intersection (e.g., the distance Da) and the path from the mobile object B to the intersection (e.g., the distance db) is larger than the threshold, the collision avoidance speed calculation unit 18 calculates a speed Vb at which the mobile object B can pass through the intersection before the mobile object A based on the collision avoidance condition indicated by Expression 5.

Furthermore, in a case where the difference between the paths is large, the collision avoidance speed calculation unit 18 may calculate a speed Vb at which the mobile object B can pass through the intersection before the mobile object A based on the collision avoidance condition indicated by Expression 5 with a preset probability (e.g., once in four times). However, the probability is not limited to once in four times.

The reason why probability-based operations are performed in a case where the difference between the paths (e.g., the difference between the distances) is large is because a collision and a deadlock are not likely to occur even without performing priority-based control in a case where the difference between the paths is large, even if a prediction error has occurred due to a communication delay.

According to the third example modification, a collision and a deadlock caused by a communication delay can be avoided.

Fourth Example Modification

In a fourth example modification, the mobile object control apparatus 10 is provided with a function of making deceleration of mobile objects 20 smooth in a case where a collision is to be avoided at an intersection, in addition to the functions described in the first example embodiment. For example, in a case where the interval between intersections is small and the density of mobile objects 20 is high, mobile objects 20 decelerate in many scenes.

In this case, the mobile object control apparatus 10 performs control so as to decelerate mobile objects 20 based on, for example, the fact that the acceleration property and the deceleration property are symmetric. The fact that the acceleration property and the deceleration property are symmetric indicates that a period for reaching from a first speed to a second speed higher than the first speed in an acceleration operation (hereinafter referred to as an "acceleration period") is equal to a period for reaching from the second speed to the first speed in a deceleration operation (hereinafter referred to as a "deceleration period").

However, when using the acceleration property and the deceleration property that are symmetric, the motions of mobile objects 20 are not smooth during deceleration. In view of this, in the fourth example modification, the mobile object control apparatus 10 makes the motions of mobile objects 20 smooth during deceleration by causing mobile objects 20 to decelerate with use of the acceleration property and the deceleration property (hereinafter referred to as the acceleration and deceleration properties) that are asymmetric. The fact that the acceleration property and the deceleration property are asymmetric indicates that the acceleration period and the deceleration period are not necessarily equal to each other. The acceleration period is, for example, longer than the deceleration period.

Figure 14:
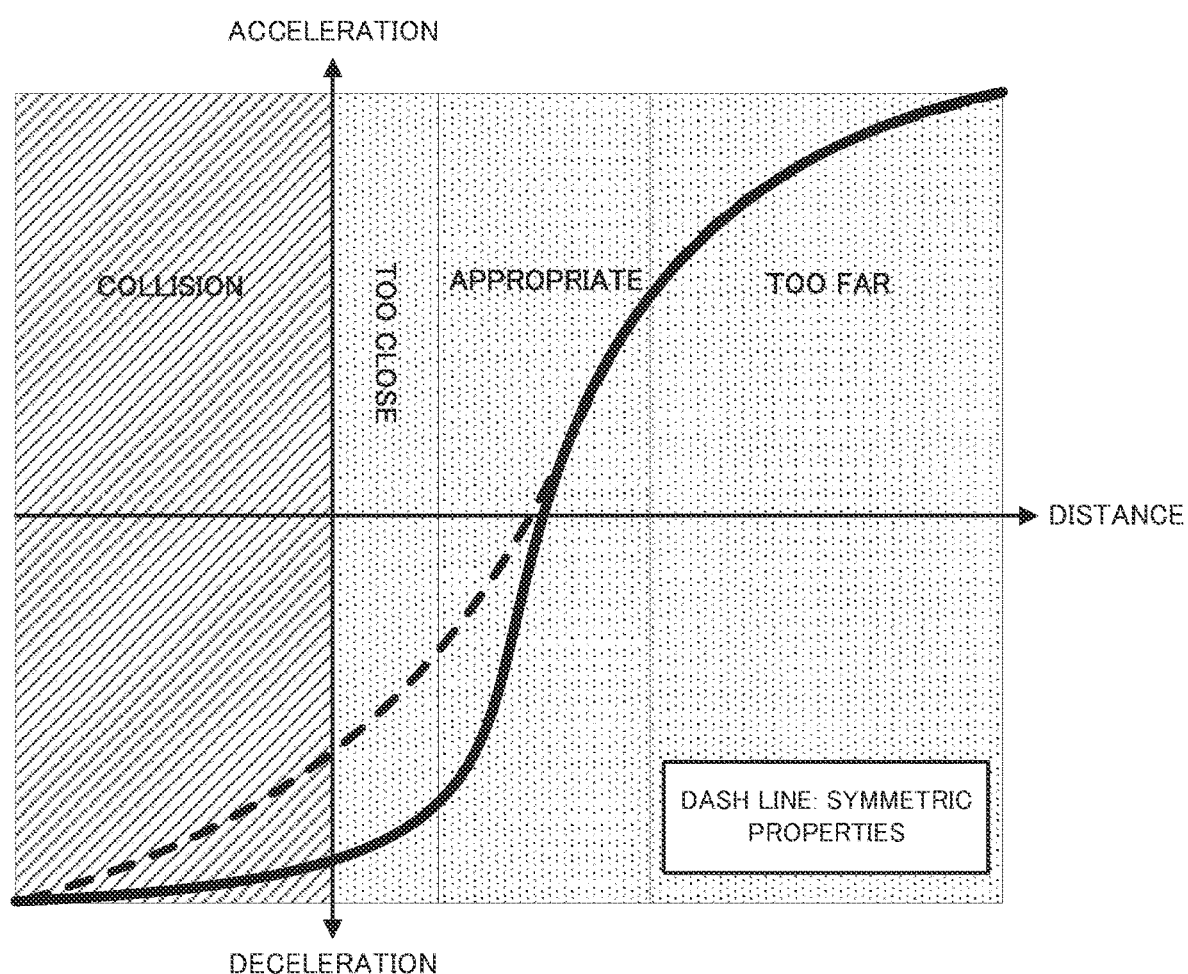
FIG. 14 is a diagram for describing examples of the asymmetric acceleration and deceleration properties.

Specifically, the asymmetric acceleration and deceleration properties illustrated in FIG. 14 are used to cause mobile objects 20 to decelerate. FIG. 14 is a diagram for describing examples of the asymmetric acceleration and deceleration properties.

In order to cause a mobile object 20 to decelerate at an intersection, the collision avoidance speed calculation unit 18 of the mobile object control apparatus 10 causes the mobile object 20 to decelerate with use of, for example, Expression 6.

[Expression 6]

$$a = \begin{cases} A^+ \tanh K1^+(d_{ij} - D) & \text{if } d_{ij} \geq D \\ A^- \tanh K1^-(d_{ij} - D) & \text{if } d_{ij} < D \end{cases}$$

$$|A^-| \geq A^+$$

$$K1^- \geq K1^+$$

$A^+$, $A^-$: Maximum acceleration
$K1^+$, $K1^-$: Control gain
$d_{ij}$: Distance between mobile objects
D: Deceleration distance That is to say, in a case where the path difference between mobile objects 20 (e.g., a distance $d_{ij}$) (=the path from the target mobile object 20a to the intersection (e.g., a distance Da)–the path from the mobile object 20b that has a high possibility of colliding with the mobile object 20 to the intersection (e.g., a distance db)) has become smaller than the distance between the mobile objects 20 (deceleration distance D), the collision avoidance speed calculation unit 18 lowers the speeds of the mobile objects 20 by making deceleration steeper than acceleration as illustrated in FIG. 14.

According to the fourth example modification, in a case where a collision is to be avoided, deceleration of mobile objects 20 can be made smooth even when the interval between intersections is small and the density of mobile objects 20 is high.

[Program]

It is sufficient that a program according to the first example embodiment and the first to fourth example modifications of the present invention be a program that causes a computer to execute steps A1 to A8 illustrated in FIG. 10. The mobile object control apparatus and the mobile object control method according to the present first example embodiment can be realized by installing this program in the computer and executing this program. In this case, the processor of the computer functions and perform processing as the prediction unit 11 (collision prediction unit 15, arrival time prediction unit 16), calculation unit 12 (passing prediction unit 17, collision avoidance speed calculation unit 18), communication unit 13, and instruction unit 14.

Also, the program according to the present first example embodiment may be executed by a computer system constructed by a plurality of computers. In this case, for example, each computer may function as one of the prediction unit 11 (collision prediction unit 15, arrival time prediction unit 16), calculation unit 12 (passing prediction unit 17, collision avoidance speed calculation unit 18), communication unit 13, and instruction unit 14.

[Physical Configuration]

Figure 15:
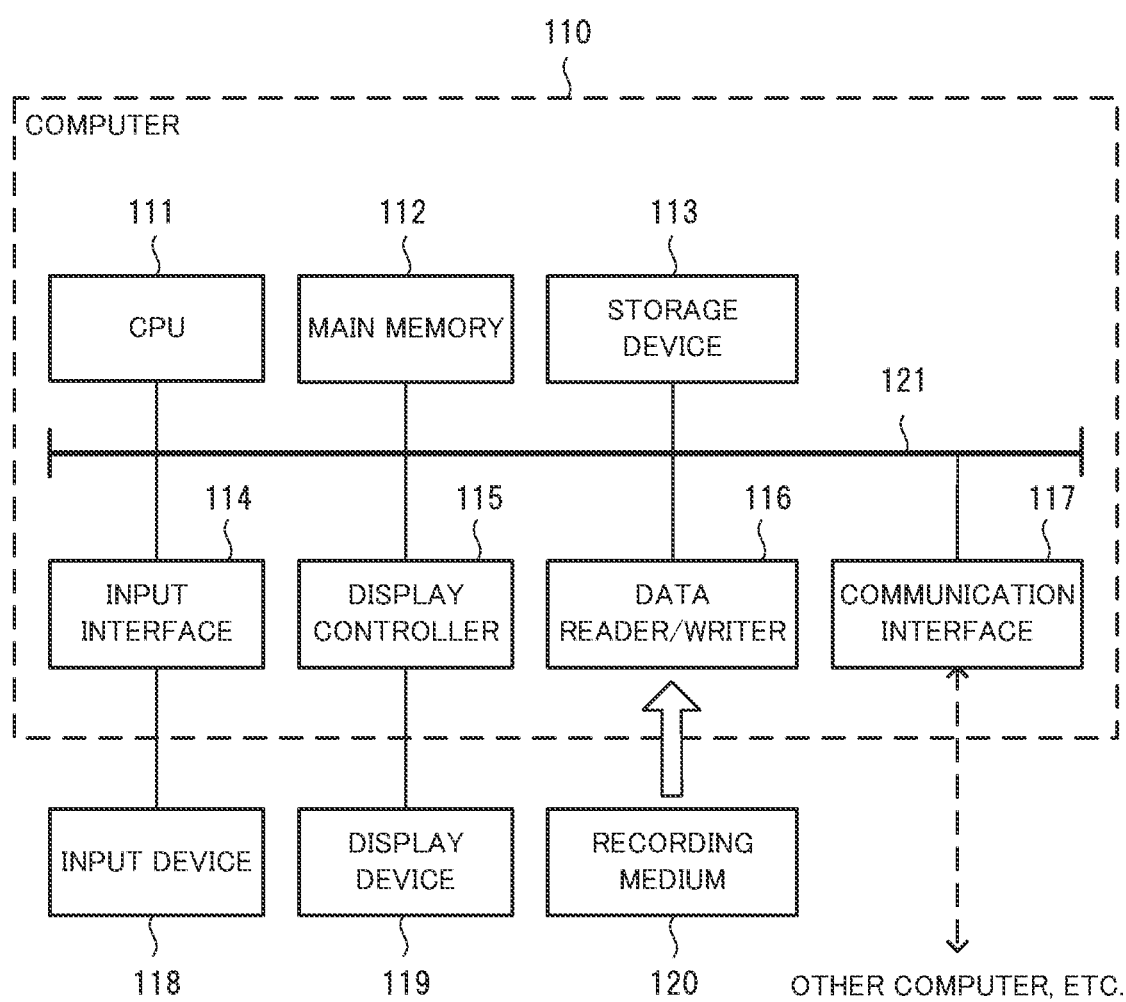
FIG. 15 is a diagram illustrating one example of a computer that realizes the mobile object control apparatus.

Using FIG. 11, a description is now given of the computer that realizes the mobile object control apparatus by executing the program according to the example embodiment. FIG. 15 is a block diagram illustrating one example of the computer that realizes the mobile object control apparatus according to the example embodiment of the present invention.

As illustrated in FIG. 15, a computer 110 includes a CPU (Central Processing Unit) 111, a main memory 112, a storage device 113, an input interface 114, a display controller 115, a data reader/writer 116, and a communication interface 117. These components are connected in such a manner that they can perform data communication with one another via a bus 121. Note that the computer 110 may include a GPU (Graphics Processing Unit) or an FPGA (Field-Programmable Gate Array) in addition to the CPU 111 or in place of the CPU 111.

The CPU 111 executes various types of computation by deploying the program (codes) according to the present example embodiment stored in the storage device 113 to the main memory 112, and executing the deployed program in a predetermined order. The main memory 112 is typically a volatile storage device, such as a DRAM (Dynamic Random Access Memory). Also, the program according to the present example embodiment is provided in a state where it is stored in a computer readable recording medium 120. Note that the program according to the present example embodiment may also be distributed over the Internet connected via the communication interface 117.

Furthermore, specific examples of the storage device 113 include a hard disk drive and also a semiconductor storage device, such as a flash memory. The input interface 114 mediates data transmission between the CPU 111 and an input device 118, such as a keyboard and a mouse. The display controller 115 is connected to a display apparatus 119, and controls displays on the display apparatus 119.

The data reader/writer 116 mediates data transmission between the CPU 111 and the recording medium 120, and executes readout of the program from the recording medium 120, as well as writing of the result of processing in the computer 110 to the recording medium 120. The communication interface 117 mediates data transmission between the CPU 111 and another computer.

Also, specific examples of the recording medium 120 include: a general-purpose semiconductor storage device, such as CF (Compact Flash®) and SD (Secure Digital); a magnetic recording medium, such as a flexible disk; and a nonvolatile recording medium, such as CD-ROM (Compact Disk Read Only Memory).

Note that the mobile object control apparatus 10 according to the present example embodiment can also be realized using items of hardware corresponding to respective components, rather than using the computer with the program installed therein. Furthermore, a part of the mobile object control apparatus 10 may be realized by the program, and the remaining part of the mobile object control apparatus 10 may be realized by hardware.

Although the invention of the present application has been described above with reference to the example embodiment, the invention of the present application is not limited to the above-described example embodiment. Various changes that can be construed by a person skilled in the art can be made to the configurations and details of the invention of the present application within the scope of the invention of the present application.

This application is based upon and claims the benefit of priority from PCT/JP2019/013835, internationally filed on Mar. 28, 2019, the disclosure of which is incorporated herein in its entirety by reference.

INDUSTRIAL APPLICABILITY

As described above, according to the present invention, a collision between mobile objects can be avoided, and in addition, a reduction in the travel efficiency of mobile objects can be suppressed, even in a case where the communication quality has decreased. The present invention is useful in the fields that require improvements in the travel efficiency while securing safety in controlling traveling of mobile objects.

REFERENCE SIGNS LIST

- 10 mobile object control apparatus
- 11 prediction unit
- 12 calculation unit
- 13 communication unit
- 14 instruction unit
- 15 collision prediction unit
- 16 arrival time prediction unit
- 17 passing prediction unit
- 18 collision avoidance speed calculation unit
- 20 mobile object
- 21 communication unit
- 22 sensor unit
- 23 position prediction unit
- 24 travel control unit
- 25 travel unit
- 100, 100a, 100b system
- 110 computer
- 111 CPU
- 112 main memory
- 113 storage device
- 114 input interface
- 115 display controller
- 116 data reader/writer
- 117 communication interface
- 118 input device
- 119 display apparatus
- 120 recording medium
- 121 bus

What is claimed is:

1. A mobile object control apparatus comprising:
a memory storing one or more instructions; and
a processor that executes the one or more instructions to:
receive, from a first mobile object, first position information indicating a first position of a first mobile object and first speed information indicating a first speed of the first mobile object;
receive, from a second mobile object, second position information indicating a second position of a second mobile object and second speed information indicating a second speed of the second mobile object;
determine first communication delay period information indicating a first communication delay period of the first mobile object as to the first position information and the first speed information;
determine second communication delay period information indicating a second communication delay period of the second mobile object as to the second position information and the second speed information;
determine intersection position information indicating a position of an intersection;
predict whether the first mobile object and the second mobile object will collide with each other at the intersection by calculating a first arrival time at which the first mobile object will arrive at the intersection and a second arrival time at which the second mobile object will arrive at the intersection, using the first and second position information, the first and second speed information, the intersection position information, and the first and second communication delay period information;
when the first mobile object and the second mobile object are predicted to collide with each other at the intersection, determine distance information indicating a difference between a first path from the first mobile object to the intersection and a second path from the second mobile object to the intersection;
determine braking distance information indicating a braking distance of the first mobile object;
calculate a different first speed of the first mobile object at which collision can be avoided at the intersection based on a collision avoidance condition by using the distance information, the braking distance information, the first and second speed information, and the first and second communication delay period information; and
cause the first mobile object to travel at the different first speed to avoid the collision at the intersection.

2. A mobile object control method performed by a computer and comprising:
receiving, from a first mobile object, first position information indicating a first position of a first mobile object and first speed information indicating a first speed of the first mobile object;
receiving, from a second mobile object, second position information indicating a second position of a second mobile object and second speed information indicating a second speed of the second mobile object;
determining first communication delay period information indicating a first communication delay period of the first mobile object as to the first position information and the first speed information;
determining second communication delay period information indicating a second communication delay period of the second mobile object as to the second position information and the second speed information;
determining intersection position information indicating a position of an intersection;
predicting whether the first mobile object and the second mobile object will collide with each other at the intersection by calculating a first arrival time at which the first mobile object will arrive at the intersection and a second arrival time at which the second mobile object will arrive at the intersection, using the first and second position information, the first and second speed information, the intersection position information, and the first and second communication delay period information;
when the first mobile object and the second mobile object are predicted to collide with each other at the intersection, determining distance information indicating a difference between a first path from the first mobile object to the intersection and a second path from the second mobile object to the intersection;

determining braking distance information indicating a braking distance of the first mobile object;
calculating a different first speed of the first mobile object at which collision can be avoided at the intersection based on a collision avoidance condition by using the distance information, the braking distance information, the first and second speed information, and the first and second communication delay period information; and
causing the first mobile object to travel at the different first speed to avoid the collision at the intersection.

3. A non-transitory computer readable recording medium storing a program executable by a computer to carry out:
receiving, from a first mobile object, first position information indicating a first position of a first mobile object and first speed information indicating a first speed of the first mobile object;
receiving, from a second mobile object, second position information indicating a second position of a second mobile object and second speed information indicating a second speed of the second mobile object;
determining first communication delay period information indicating a first communication delay period of the first mobile object as to the first position information and the first speed information;
determining second communication delay period information indicating a second communication delay period of the second mobile object as to the second position information and the second speed information;
determining intersection position information indicating a position of an intersection;
predicting whether the first mobile object and the second mobile object will collide with each other at the intersection by calculating a first arrival time at which the first mobile object will arrive at the intersection and a second arrival time at which the second mobile object will arrive at the intersection, using the first and second position information, the first and second speed information, the intersection position information, and the first and second communication delay period information;
when the first mobile object and the second mobile object are predicted to collide with each other at the intersection, determining distance information indicating a difference between a first path from the first mobile object to the intersection and a second path from the second mobile object to the intersection;
determining braking distance information indicating a braking distance of the first mobile object;
calculating a different first speed of the first mobile object at which collision can be avoided at the intersection based on a collision avoidance condition by using the distance information, the braking distance information, the first and second speed information, and the first and second communication delay period information; and
causing the first mobile object to travel at the different first speed to avoid the collision at the intersection.

4. The mobile object control apparatus according to claim 1, wherein the processor is further to:
extract a third mobile object that remains in an intersection area and has passed through the intersection; and
predict that the third mobile object has a high possibility of colliding with the first mobile object at the intersection, the intersection area being set as the intersection when the first mobile object passes through the intersection.

5. The mobile object control apparatus according to claim 4,
wherein when the first mobile object has entered a preset area preceding the intersection, the processor predicts whether the first mobile object and the second mobile object will collide at the intersection.

6. The mobile object control apparatus according to claim 4, wherein the processor
calculates the different first speed at which the first mobile object can pass through the intersection before the second mobile object when a priority degree of the first mobile object is higher than a priority degree of the second mobile object, the first mobile object can pass through the intersection before a time at which the second mobile object arrives at the intersection, and the difference between the first path and the second path is smaller than or equal to a threshold for determining whether a mobile object with a high priority degree is to pass a mobile object with a low priority degree;
calculate the different first speed at which the first mobile object can pass through the intersection before the second mobile object when the difference between the first path and the second path; is larger than the threshold
calculate a different second speed at which the second mobile object can pass through the intersection before the first mobile object when the priority degree of the first mobile object is lower than the priority degree of the second mobile object, the second mobile object can pass through the intersection before a time at which the first mobile object arrives at the intersection, and the difference between the first path and the second path is smaller than or equal to the threshold; and
calculate the different second speed at which the second mobile object can pass through the intersection before the first mobile object when the difference between the first path and the second path is larger than the threshold.

7. The mobile object control apparatus according to claim 4, wherein the processor is further to:
cause the first and the second mobile objects to decelerate so that steepness thereof is greater than steepness of acceleration.

8. The mobile object control apparatus according to claim 1, wherein the processor
extracts mobile objects that are not detectable even with use of a sensor of the first mobile object from mobile objects present in an area corresponding to the first mobile object and which are other than the first mobile object;
select the second mobile object by further extracting a mobile object that has not arrived at the intersection yet from the mobile objects that are not detectable even with use of the sensor of the first mobile object; and
when transmission delay period information indicating a transmission delay period of the second mobile object is or larger than or equal to a preset threshold, assume that a communication quality has decreased, and predict that the second mobile object has a high possibility of colliding with the first mobile object at the intersection.

9. The mobile object control apparatus according to claim 1, wherein
with regard to the second arrival time, the processor uses a maximum speed as the second speed information.

10. The mobile object control apparatus according to claim 1, wherein
the first mobile object and the second mobile object travel while forming a platoon.

11. The mobile object control apparatus according to claim 8, wherein
when the second mobile object that had not been detectable with use of the sensor of the first mobile object is now able to be detected with use of the sensor, the changes the first speed of the first mobile object to an original speed.

12. The mobile object control method according to claim 2, further comprising:
extracting a third mobile object that remains in an intersection area and has passed through the intersection; and
predicting that the third mobile object has a high possibility of colliding with the first mobile object at the intersection, the intersection area set as the intersection when the first mobile object passes through the intersection.

13. The non-transitory computer readable recording medium according to claim 3, wherein the program is executable by the computer to further carry out:
extracting a third mobile object that remains in an intersection area and has passed through the intersection; and
predicting that the third mobile object has a high possibility of colliding with the first mobile object at the intersection, the intersection area being set as the intersection when the first mobile object passes through the intersection.

* * * * *